United States Patent [19]
Goldmark et al.

[11] 4,009,331
[45] Feb. 22, 1977

[54] STILL PICTURE PROGRAM VIDEO RECORDING COMPOSING AND PLAYBACK METHOD AND SYSTEM

[75] Inventors: Peter C. Goldmark, Stamford; Donald T. Dolan, Ridgefield; Arvind C. Desai, Stamford; John M. Hollywood, Old Greenwich, all of Conn.

[73] Assignee: Goldmark Communications Corporation, Stamford, Conn.

[22] Filed: June 6, 1975

[21] Appl. No.: 584,624

Related U.S. Application Data

[63] Continuation-in-part of Ser. No. 536,189, Dec. 24, 1974, abandoned.

[52] U.S. Cl. .................. 358/127; 178/DIG. 23; 178/DIG. 28; 360/33
[51] Int. Cl.[2] .................................... H04N 5/78
[58] Field of Search .......... 178/5.8 R, 5.6, DIG. 23, 178/69.5 R, 6.6 R, 6.6 DD, 6.6 FS, DIG. 28; 360/18, 19, 22, 33, 35, 10, 80; 358/4; 352/15, 16, 17, 133, 135, 123

[56] References Cited

UNITED STATES PATENTS

| | | | |
|---|---|---|---|
| 3,234,323 | 2/1966 | Kihara | 358/4 |
| 3,701,846 | 10/1972 | Zensefilis | 360/19 |
| 3,811,008 | 5/1974 | Lee | 178/DIG. 23 |
| 3,837,003 | 9/1974 | Justice | 358/4 |
| 3,854,010 | 12/1974 | Yoshino et al. | 178/69.5 |
| 3,859,458 | 1/1975 | Takezawa et al. | 178/DIG. 23 |
| 3,865,973 | 2/1975 | Masuda et al. | 178/69.5 |
| 3,878,560 | 4/1975 | Ramage | 360/35 |

Primary Examiner—John C. Martin
Attorney, Agent, or Firm—St. Onge Mayers Steward & Reens

[57] ABSTRACT

In a first embodiment a still picture video program composing and playback system is described whereby a plurality of still picture programs can be recorded on a common video recording such as a video tape. A composing operation involves the assembly of audio narration for the programs on separate tracks with cue signals which signify successively different picture displays being recorded on a separate track. The composing of these audio programs and still pictures on a common video tape is obtained with control logic responsive to played back cue signals. The recording of still pictures is obtained with a slide projector and television camera, both of which are synchronized by the control logic to record video frames and cue signals on the video tape. In a second embodiment still pictures and a motion sequence for different video programs are interleaved and recorded on a common medium. In a playback system a temporary video frame storage device is used to retain and display a still picture until a decoded cue signal causes a video frame replacement in the storage device. As described in a preferred embodiment, monochrome (y) and chroma signals are separated and separately recorded for enhanced picture display resolution. A system for composing a large number of video programs on a common video recording is described. Control logic for orderly recording of still picture video frames is described.

39 Claims, 18 Drawing Figures

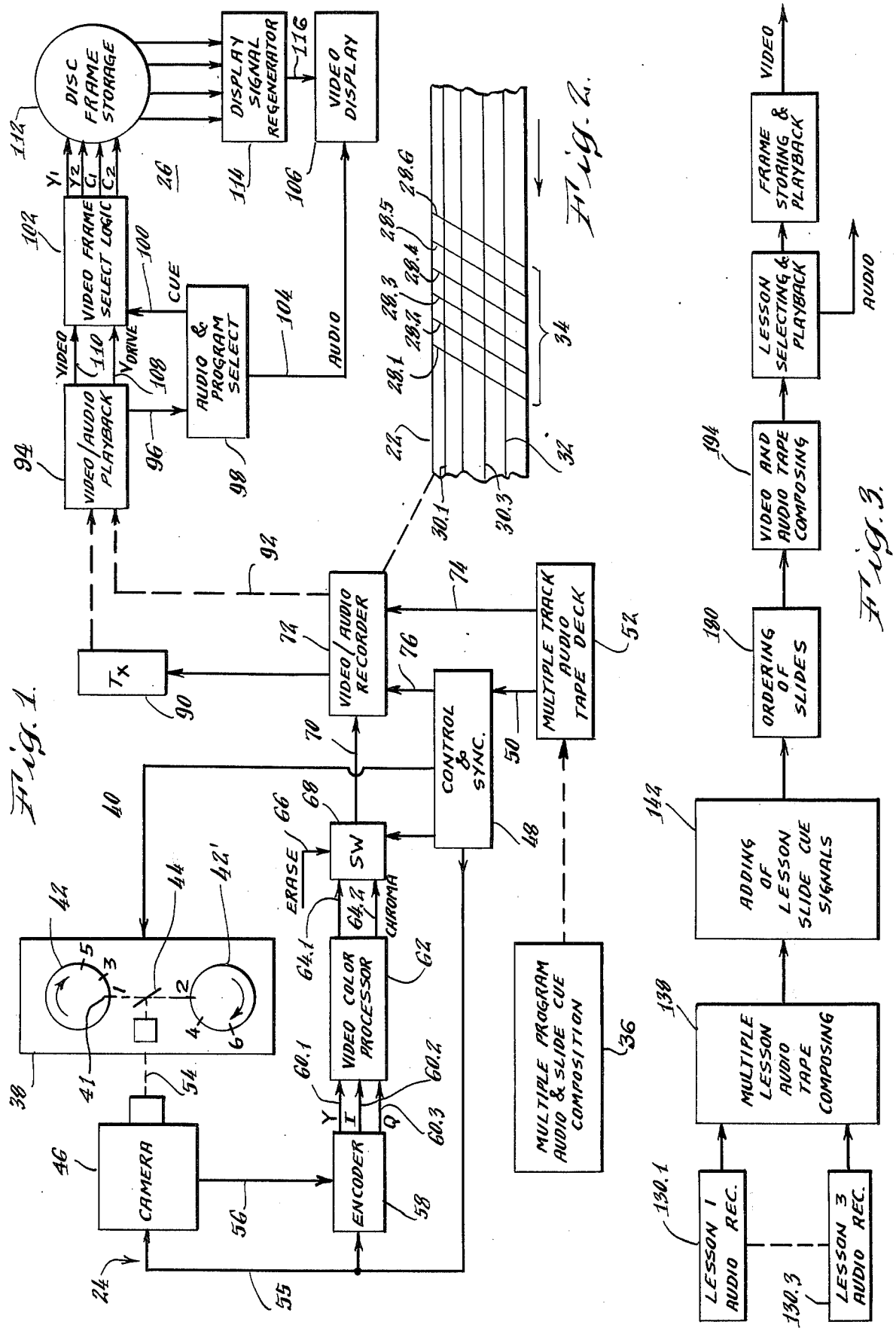

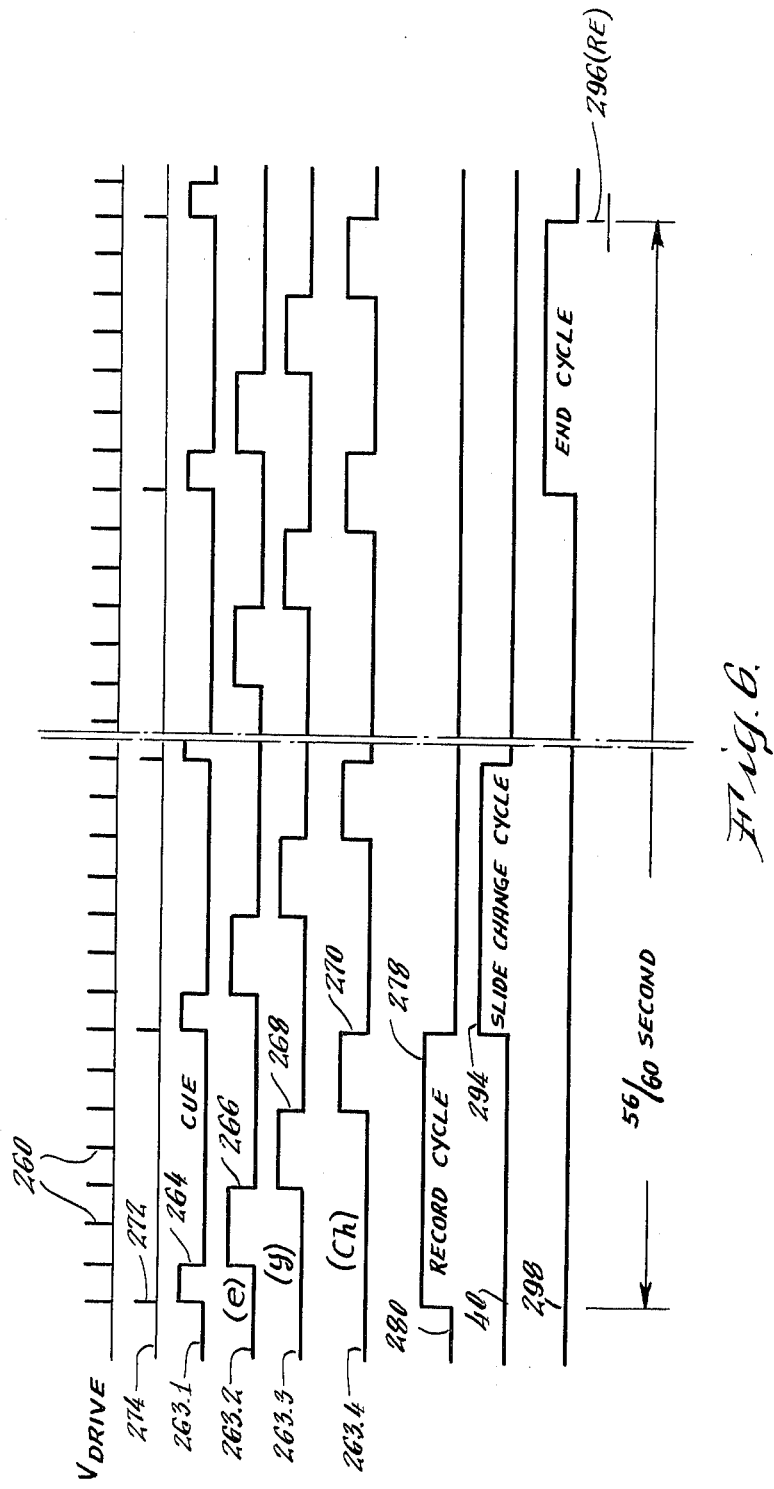

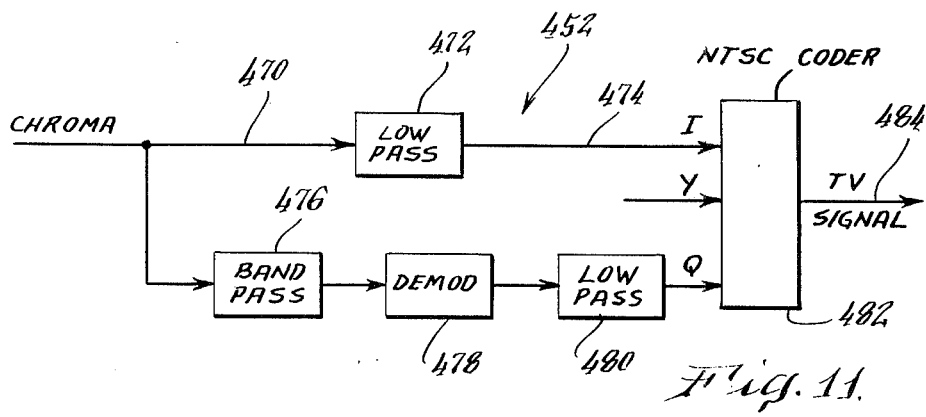
Fig. 11.
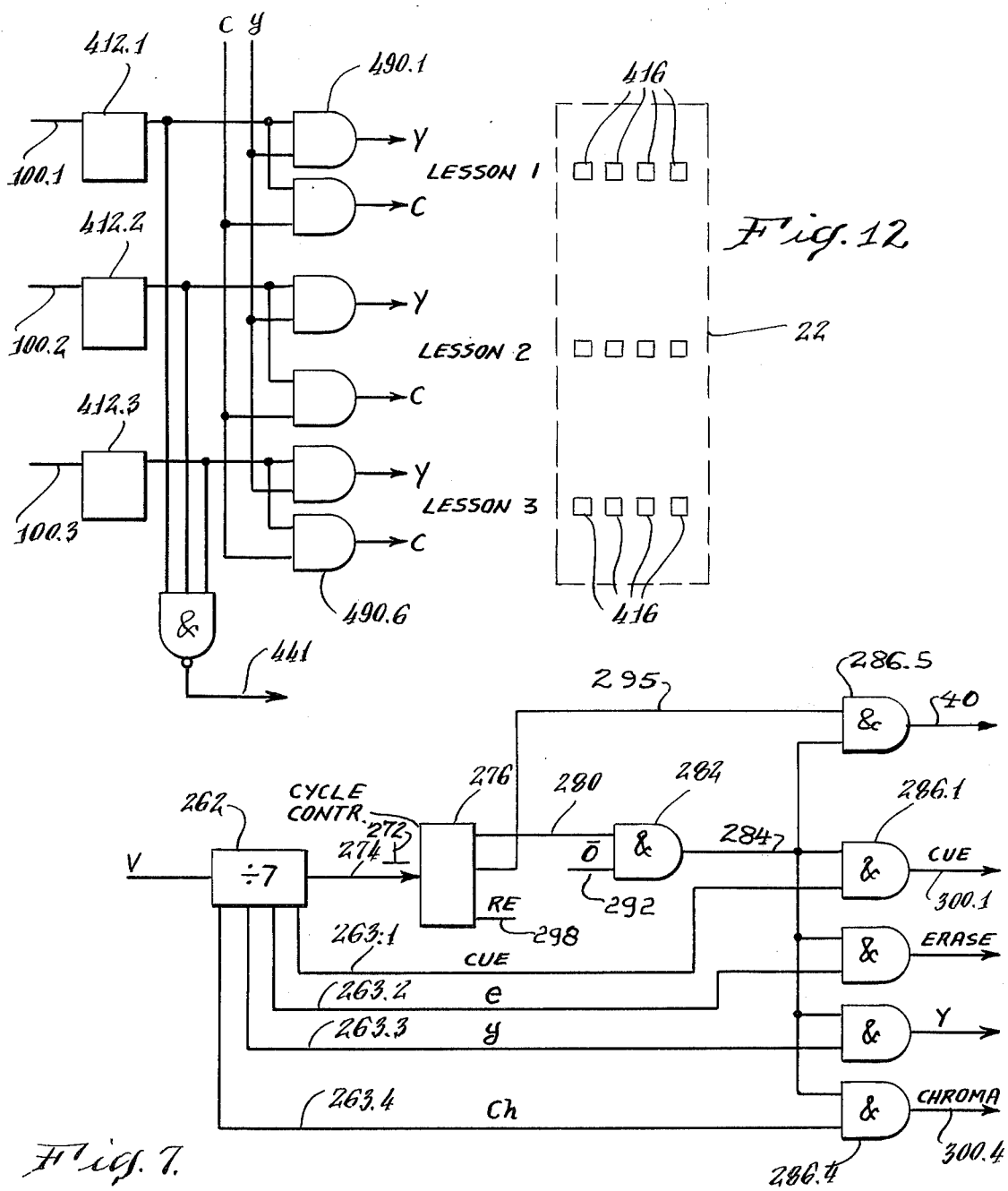
Fig. 12.
Fig. 7.

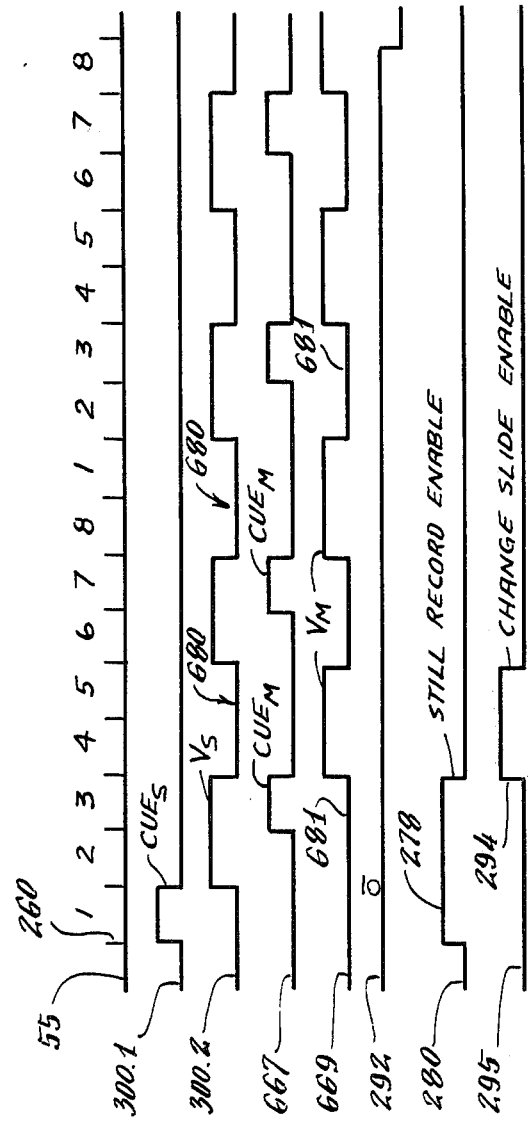

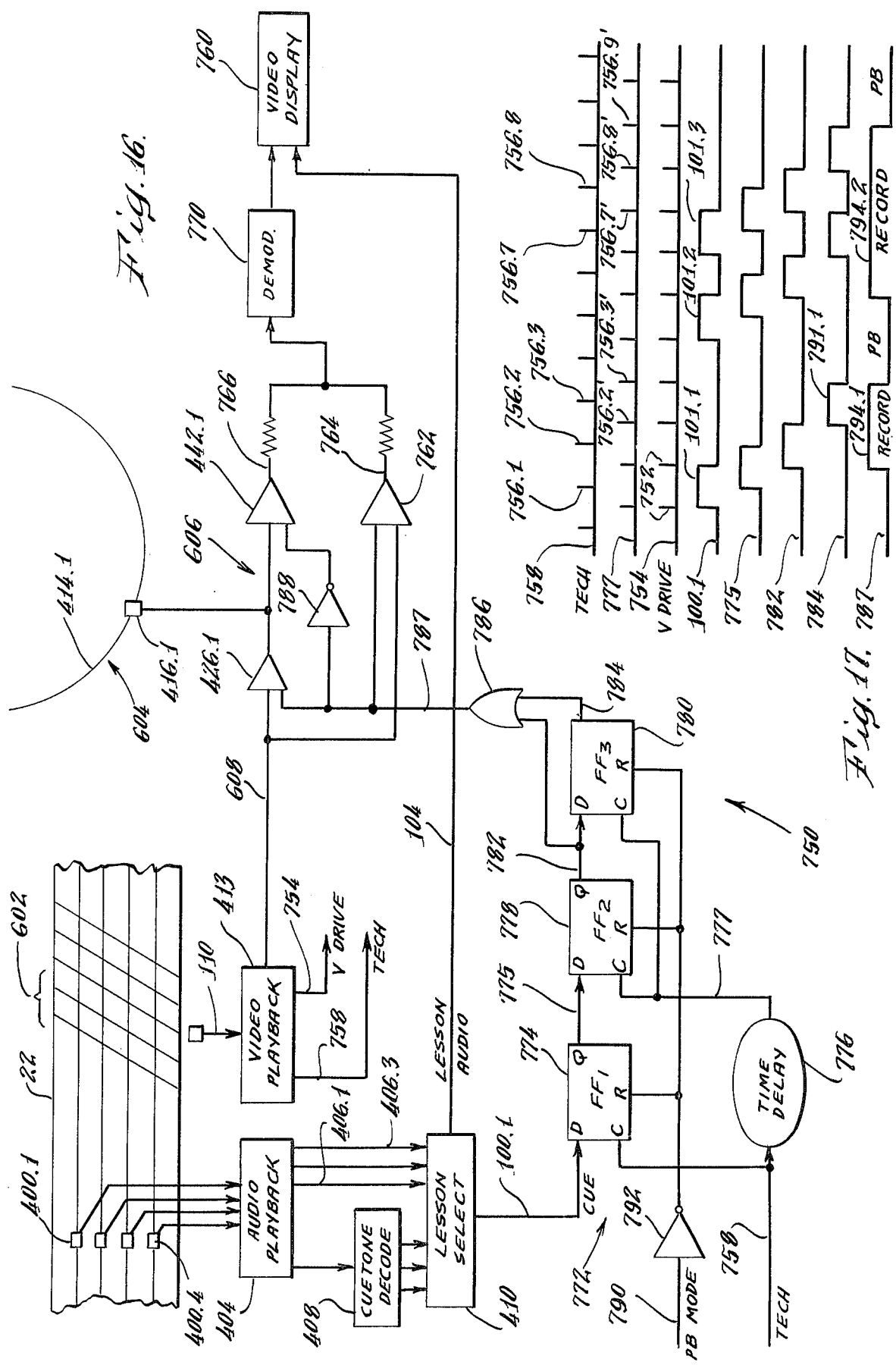

STILL PICTURE PROGRAM VIDEO RECORDING COMPOSING AND PLAYBACK METHOD AND SYSTEM

This is a continuation-in-part of U.S. Pat. application entitled STILL PICTURE PROGRAM VIDEO RECORDING COMPOSING AND PLAYBACK SYSTEM filed by Peter C. Goldmark, Donald T. Dolan, Arvind C. Desai and John Hollywood on Dec. 24, 1974 bearing Ser. No. 536,189, now abandoned.

FIELD OF THE INVENTION

This invention relates to a system for composing and playing back different video programs employing still pictures and motion sequences with related audio. More specifically, this invention relates to a method and system for composing a plurality of video programs such as lessons on a common video recording medium with still pictures and audio for each program as well as with motion sequences.

BACKGROUND OF THE INVENTION

The widespread availability of television displays and video tape recorders and playback devices has enlarged the educational potential of these devices. For example, in a typical educational use, single video frames of individual pictures are recorded to form a lesson. During playback audio is projected and the single pictures displayed in the order they are called for during the lesson. Various single frame television display devices have been described in the art such as a still picture display and sound recorder described in an article entitled "Color-TV Player Shows Single Frames and Uses Audio Cassettes" published in Electronics, Nov. 6, 1972 at page 65.

Other still frames and sound projecting systems have been described in the art such as in U.S. Pat. No. 3,715,481 to Harr and U.S. Pat. No. 3,614,309 to Presti.

In a co-pending application entitled "Video Recorder and Playback Apparatus" filed on Oct. 13, 1972 with Ser. No. 297,180 now U.S. Pat. No. 3,938,189 by Peter C. Goldmark and assigned to the same assignee as of this application, a system is described for transmitting and playing back programs formed of still pictures with audio narration. The still pictures are recorded on single frame storage devices and played back together with audio information. Cue pulses are employed with the audio narration to initiate the display of new video frames. The audio narration for each still picture is stored or separated by cue pulses to enable convenient program composition and playback.

SUMMARY OF THE INVENTION

With a video composing and playback system in accordance with the invention, a plurality of still picture programs may be composed on a common video recording medium, such as a tape, drum or disc, and played back by selecting a desired program. The still pictures are displayed along with the projection or generation of associated audio to provide program signals suitable for playback display on conventional or special television displays.

As described in detail with reference to one embodiment, the composition of a video recording may include three separate programs or lessons. However, a large number of programs may be composed on a single video recording to increase the selection of programs for playback.

When a large number of still picture programs have been recorded on a common video recording, the system of this invention may be conventionally employed to play back several programs simultaneously. In this manner several physically separated audiences can each view a different still picture program from the same video recording at the same time.

As described with respect to another embodiment, both still pictures and motion sequences for different programs are interleaved on a common recording medium. A playback system is provided whereby motion sequences and still pictures of a program may be played back.

It is, therefore, an object of this invention to provide a method and system for composing and playing back still picture programs with or without motion sequences.

It is a further object of this invention to provide an apparatus and method for recording a plurality of still picture programs with or without motion sequences on a video recording. It is still further an object of this invention to provide a system for composing and playback of still picture video programs with high quality color and resolution characteristics for display on conventional television displays.

These and other objects and advantages of a still picture video program composing and playback system in accordance with the invention can be understood from the following detailed description of several embodiments described in conjunction with the drawings.

BRIEF DESCRIPTION OF DRAWINGS

FIG. 1 is a block diagram view of a video still picture composing and playback system in accordance with the invention;

FIG. 2 is a schematic representation of a video tape on which still picture programs have been recorded in accordance with the invention;

FIG. 3 is a block diagram of sequential steps employed in generating and displaying a video still picture program in accordance with the invention;

FIG. 6 is a timing diagram of control signals generated to record multiple still picture programs on a common video tape;

FIG. 7 is a schematic logic diagram employed in the composing system shown in FIG. 5;

FIG. 11 is a block diagram view of the rf portion of the playback system shown in FIG. 10;

FIG. 12 is a block diagram for a network used to enable playback of a plurality of still picture programs to different displays from a common still picture video recording;

FIG. 15 is a timing diagram of signals generated in the system of FIG. 14;

FIG. 15A is a schematic representation of the interleaving of motion and still picture sequences in accordance with the invention;

FIG. 16 is a schematic block diagram for a playback system of still picture programs with motion sequences; and FIG. 17 is a timing diagram of signals generated in the system of FIG. 16.

DETAILED DESCRIPTION OF EMBODIMENT

FIGS. 1 and 2

Figure 4:
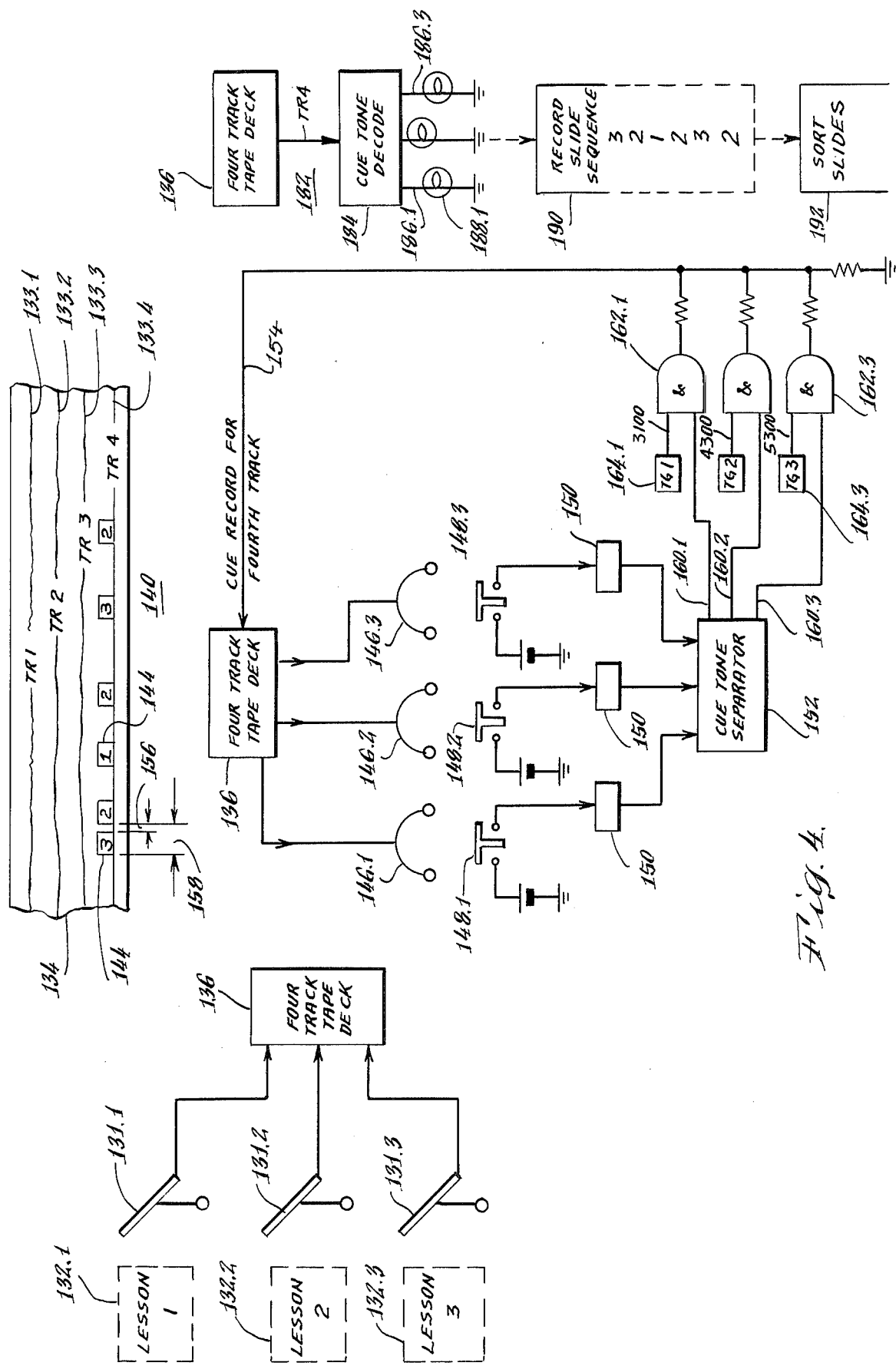
FIG. 4 is a block diagram and partial schematic view of audio composing and slide arranging step and devices initially employed in a video still picture program composition.

With reference to FIGS. 1 and 2, a system 20 for composing and recording a plurality of still picture programs on a video storage medium such as a video tape 22 is shown. The system includes a video still picture composer 24 and a playback system 26. The term "video storage medium" is used herein to denote any suitable medium on which television signals may be recorded and can be played back from. The recorded signals are in such form as is necessary and compatible for storage and playback from the medium.

The storage medium employed in system 20 is a video magnetic tape, though other video recording and playback materials may be used such as a disc, drum or the like. The video tape 22 is provided with video fields 28 using conventional video recording devices as are well known in the art. In addition to the video field 28, audio tracks 30 are formed on tape 22 and recorded in parallel tracks each of which carries audio narration related to a specific still picture program. An audio control track 32 is provided to carry cue control signals for composing and playback control as shall be further explained.

The video fields 28 are arranged in groups of six to form a composite video frame 34 representative of a still picture to be recorded or played back. The video still picture frame includes an initial pair of erase fields 28.1 and 28.2, followed by a pair of monochrome Y fields Y1 and Y2 (corresponding to fields 28.3 and 28.4) and a pair of color carrying chroma fields C1 and C2 (corresponding to fields 28.5 and 28.6). The Y1, Y2 and C1, C2 fields are intended to interlace and align with each other to form a single colores still picture video frame for television display.

As used herein the term video frame includes both the conventional pair of interlaced color or monochrome fields encountered in television broadcast as well as the six separate fields used for the still pictures in system 20. The term video frame further encompasses the use of other multiples of fields such as four when a pair of erasure fields and a pair of interlaced video signal fields are used.

When a multiple of programs are recorded on a common video recording medium such as the video tape 22 shown in FIG. 2, it can be appreciated that still picture changes for different programs occur at different times. Accordingly, the video frames 34 as recorded on the recording medium 22 are usually distributed along the tape in accordance and at locations determined by the still picture program to which they belong. During the composing and video tape recording in accordance with the invention, care is taken to assure that the recording of each video frame 34 corresponds precisely with the appropriate picture needed at that time and place by a particular program.

The composition operation for a video still picture recording is commenced with a device 36 in FIG. 1 which initially combines a plurality of audio narration segments of the programs involved on a common multiple track audio tape. The combining operation is followed by the addition of appropriate machine identifiable cue signals, each being associated respectively with a specific audio program recorded on an audio track.

Each of the programs contemplates narration with or about accompanying still pictures. The latter are formed beforehand and reduced to slides, in color or black and white. The slides for each program may be numbered in the sequence by which they must be displayed during playback of the program. The slides are shaped and selected to enable automatic sequential projection with conventional slide projectors.

Hence, when the combined multiple audio program carrying tape with the appropriate machine decodable cue signals has been formed, the video recording system 24 can be used to form a composite multiple still picture program carrying video recording 22.

As illustrated in FIG. 1, program slides from which video frames 34 are obtained are placed in a conventional slide projector 38 in the order in which they are to be displayed as determined by cue signals on a control track of a multiple audio tape. For system 20 the slides of the programs are intermixed, though the order of their video recording is carefully controlled to assure recording to video frames 34 in the proper sequence.

The slide projector 38 may be a conventional high-speed changer such as Model S-32 made by The Spindler and Sauppe Company of North Hollywood, California. The latter projector responds to an appropriate cue signal on its input line 40 within about 1/10 of a second to display and project a new slide. The projector retains the slides 41 on reels 42–42' which are alternately advanced to project, after reflection on a pivotable mirror 44, a slide picture onto a video camera 46.

The cue signal on line 40 is derived from a control network 48 responsive to audio cue signals played back on line 50 from an audio control track located on a composite audio program tape in a multiple track audio tape deck 52. Each cue signal causes an automatic advance of the projector so that the slides being projected change in an orderly sequence from one to the maximum number contained by reels 42–42'. Since the reels can continue to rotatably advance in sequence, one may replace previously projected slides with new slides if the total number of still pictures during the video recording process exceeds the capacity of the reels 42–42'.

The television camera 46 is oriented to focus along optic axis 54 on each projector slide. The camera 46 is controlled with sync signals generated on line 55 by control network 48. The output line 56 of camera 46 carries the usual red, blue and green signals which are applied to a conventional matrix encoder 58 to produce conventional monochrome Y signals as well as I and Q video color signals on lines 60.1, 60.2 and 60.3 respectively.

In light of the light use of the video frame storage capacity of video tape 22 a high resolution wide bandwidth video frame 34 is preferably recorded. For example, radio frequency modulation or pulse period modulation can be advantageously used instead of base-band video signals. Thus, relatively wide bandwidth monochrome Y signals are recorded for enhanced resolution with wide bandwidth color carrying chroma (c) signals. Such improved resolution enables the reading of displayed fine details such as written information frequently employed in educational still picture programs. A video color processor 62 is, therefore, provided to respond to the Y, I and Q signals on lines 60 and produce the desired wide bandwidth Y and chroma signals on lines 64.1 and 64.2 respectively.

The Y and chroma signals, together with an erase signal as represented by a "black video signal" level on line 66 are applied to a switch network 68 which is actuated under control by control network 48 to sequentially record the fields 28 along output line 70 on a magnetic tape in a video tape recorder 72.

The video recorder 72 is a conventional video tape recorder modified with suitable audio recording heads, not shown, located to record the audio narration on the tape 22 as shown in FIG. 2. Hence, at the same time that video frames are recorded on tape 22, audio programs from the audio tape deck 52 are applied along line 74, as well as cue signals along line 76 from control network 48, for simultaneous recording on tracks 30 and 32 of the tape 22.

The entire recording process is carried out automatically until the entire audio programs from the tape deck 52 have been recorded on tape 22. The end product of the still picture program composition in accordance with the invention is thus a video recording carrying parallel tracks 30 of audio information as well as video frame 34 whih are associated with respective audio programs. In addition, an audio control track 32 is included to provide cue signals enabling the proper display of the video frames at the correct times. The video recording also carries the usual synchronization signals, such as V drive pulses, used in conventional video tape recording but have been deleted from FIG. 2 for clarity.

The playback apparatus 26 is shown in the same FIG. 1 as the video composing apparatus 24 though it should be understood that these devices may and usually are at separate locations. A transmitter 90 may be used to transfer the combined audio and video information recored on video 22 to a remote location. Alternately, as suggested by the dashed line 92, the video tape 22 may be mailed to the remote location where a playback system is located.

The video playback system 26 includes a conventional video tape playback device 94, which is modified with suitably located audio heads (not shown) to provide playback of the audio tracks 30. The audio signals are applied along line 96 to an audio program select network 98 which identifies the cue signals and selects the audio programs to be projected. The identified cue signals are applied along line 100 to video frame select logic 102 while the selected audio is applied along line 104 to a display 106.

The video playback apparatus 94 provides appropriate V drive pulses corresponding to the vertical sync pulses on line 108 and video signals from the played back video tape. The video frame select logic 102 is employed to separate the video modulated rf signals using, for example, pulse period or frequency modulation, into the Y and chroma fields for temporary storage on a single frame storage and playback apparatus 112. The temporary frame storage device 112 may be in the form of a disc memory such as model MDM-1500 made by The Hitachi Company of Japan. The disc 112 includes a multiple number of video tracks on which the monochrome fields Y1, Y2 and chroma color field signals C1 and C2 can be separately recorded.

The previously recorded erase fields 28.1 and 28.2 are used to erase previous video signals on the disc tracks. After a single frame has been stored in response to a cue signal, the apparatus 26 returns the disc 112 into a playback mode whereby the played back video signals are applied to video signal regeneration network 114 to provide display 106 with the proper video signals on output line 116.

With system 20 as shown in FIG. 1 a multiple number of still picture programs can be recorded on a common video tape and played back at a remote location. The programs to be played back can be selected from the recorded programs on the composite video recording 22. For purposes of this application three still picture programs are combined on a video tape, through in practice one may appreciate that a larger number of still picture programs of the order of 24 can be composed, depending upon the number of parallel audio tracks that can be accommodated on the video tape.

FIGS. 3 and 4

The sequential steps employed in composing the video tape 22 are set forth in FIG. 3 and commences with the audio recording steps 130 of the programs on a suitable audio recording medium such as a tape cassette or a reel to reel tape recorder. This step, as shown in FIG. 4, starts with previously prepared written transcripts 132 of, say, three lessons incorporating the use of audio narration about accompanying still pictures.

The audio of each of the lessons 132 is at first recorded through microphones 131 on a separate track 133 of a tape in, for example, a four track audio tape deck 136. The first lesson 132.1 is recorded by simply reading from the lesson in a manner which one would wish the listener to be receiving the information on the transcript 132.1.

The recording of all the lessons 132 need not occur simultaneously, but may occur at different times as appears suitable. For example, each of the lessons may be recorded on separate cassettes or tapes which are then mechanically combined respectively at step 138 (see FIG. 3) on the three tape tracks 133 in the four track tape deck 136. The end result is, as shown at 140 in FIG. 4, an audio tape 134 including three tracks 133.1, 133.2 and 133.3 of audio program information. A fourth control track 133.4 is initially left empty until the next step 142 (see FIG. 3) when appropriate cue signals are added to identify when a still picture is to be displayed for each lesson 132.

As shown in FIG. 4, audio frequency cue signals 144 for control track 133.4 are added simultaneously for all audio lesson tracks 133. Hence, the four track tape deck 136 is operated in a manner whereby the three lesson carrying tracks 133 are being played back while the fourth or cue control track 133.4 is operated by the addition of suitable known recording controls in a recording mode.

While the three lesson tracks 133.1–133.3 are being listened to with earphones 146 by operators, they are simultaneously reading the appropriate lesson transcripts 132. When a need for a slide change is noted by an operator, he depresses a suitable switch 148 connected through appropriate switch debouncer networks 150 to a separator network 152 to eventually record along line 154 an appropriate cue tone code 144 on the control track 133.4 Debouncer networks 150 are latching circuits to eliminate the effect of switch contacts bounce.

The cue tones 144 are recorded on control track 133.4 each with a different frequency for a different audio program to enable unique determination as to which lesson or audio track requires a picture change. For the specific embodiment shown in FIG. 4, three audio frequencies are selected, respectively 3100, 4300 and 5300 Hz for lessons 132.1, 132.2 and 132.3 respectively.

Figure 8:
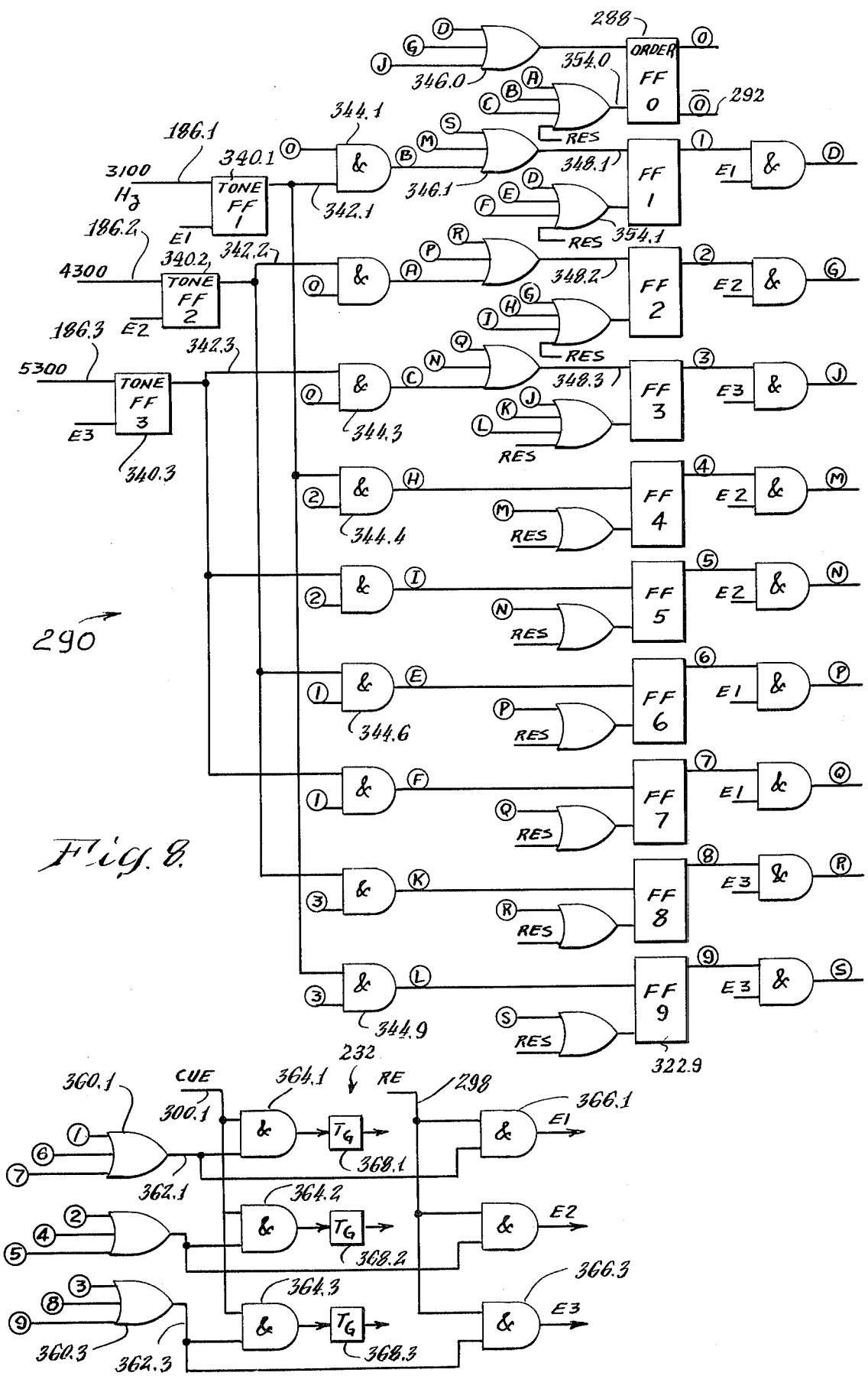
FIG. 8 is a schematic view of an order control network used in the system shown in FIG. 5.
Figure 9:
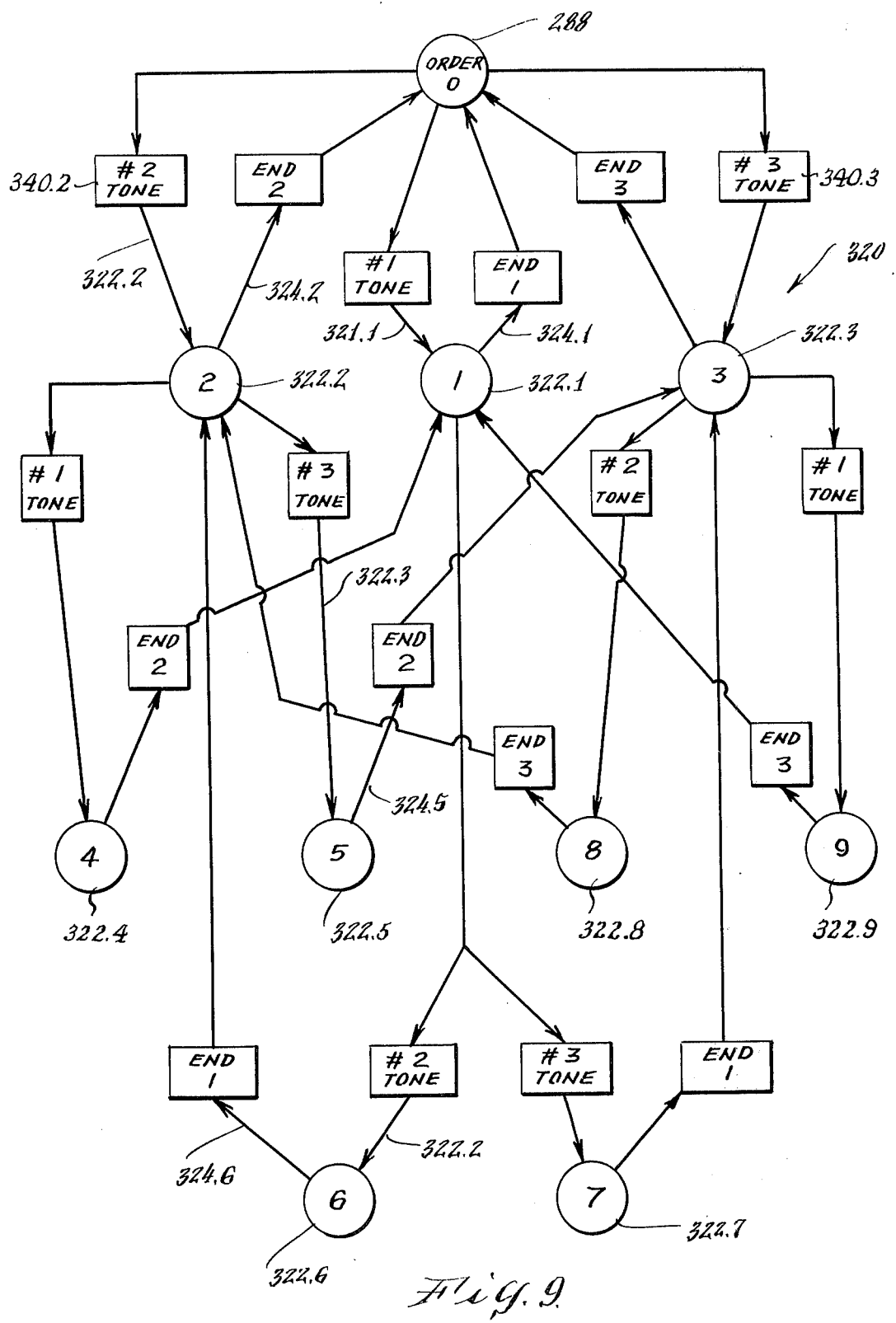
FIG. 9 is an organization diagram for the control network shown in FIG. 8.

Separator network 152 is employed to assure that the cue signals 144 are each recorded without overlap with a minimum physical separation as denoted by a time gap 156 between cue tones 144.1 and 144.2 on track 133.4 Separate network 52 may be a network such as explained with respect to FIGS. 8 and 9. Alternatively, an appropriate scanner network, which does not permit the recording of cue tones 144 at closer time spacing than a predetermined minimum may be used.

One further might record the cue tones 144 with overlap as they may occur. An order network such as will be described with reference to FIGS. 8 and 9 can then be used to assure appropriate response to the cue tone signals during the video recording composing operation. Preferably, however, a separation of about 1/10 of a second is employed during the audio cue tone adding step 142.

Each of the cue signals 144 is made sufficiently long in duration 158 (see control track 133.4 in FIG. 4) to enable playback detection and response. The separator network 152 generates appropriate cue tone enabling pulses on output lines 160.1–160.3 applied to AND gates 162 to allow audio tones from different tone generators 164 to be applied on common record line 154 for recording on control track 133.4

After the addition of cue control signals 144 a next operation 180 (see FIG. 3) requires the appropriate sorting of slides 41. This step arranges the slides in the order called for when the cue tones 144 are played back from track 133.4. When the slides have been so arranged they can be recorded on the video tape 22 in the order required by the programs 132. It can be appreciated that the order of the cue signals 144 will be random along the control track 133.4

The slide sorting step 180 is implemented by playing back the control track 133.4 from the four track tape deck 136 as shown at 182 in FIG. 4 and applying the cue tones to a one decode network 184. The outputs of the decode network 184 are three separate lines 186.1–186.3 corresponding respectively to programs 132.1–132.3. Lines 186 are each applied to an appropriately numbered light 188. An operator then records the slide sequence which may, as shown at track 133.4 in FIG. 4, be, for example, three-two-one-two-three-two, etc. as shown at 190.

When the entire sequence of cue tones for the three programs 132 have been recorded, the slides are sorted at 192 and located in appropriate sequence in the slide projector 38 (see FIG. 1). The audio tape 134 is then rewound to its beginning and the next step 194 (see FIG. 4) of video tape composing can be commenced.

FIG. 5

Figure 5:
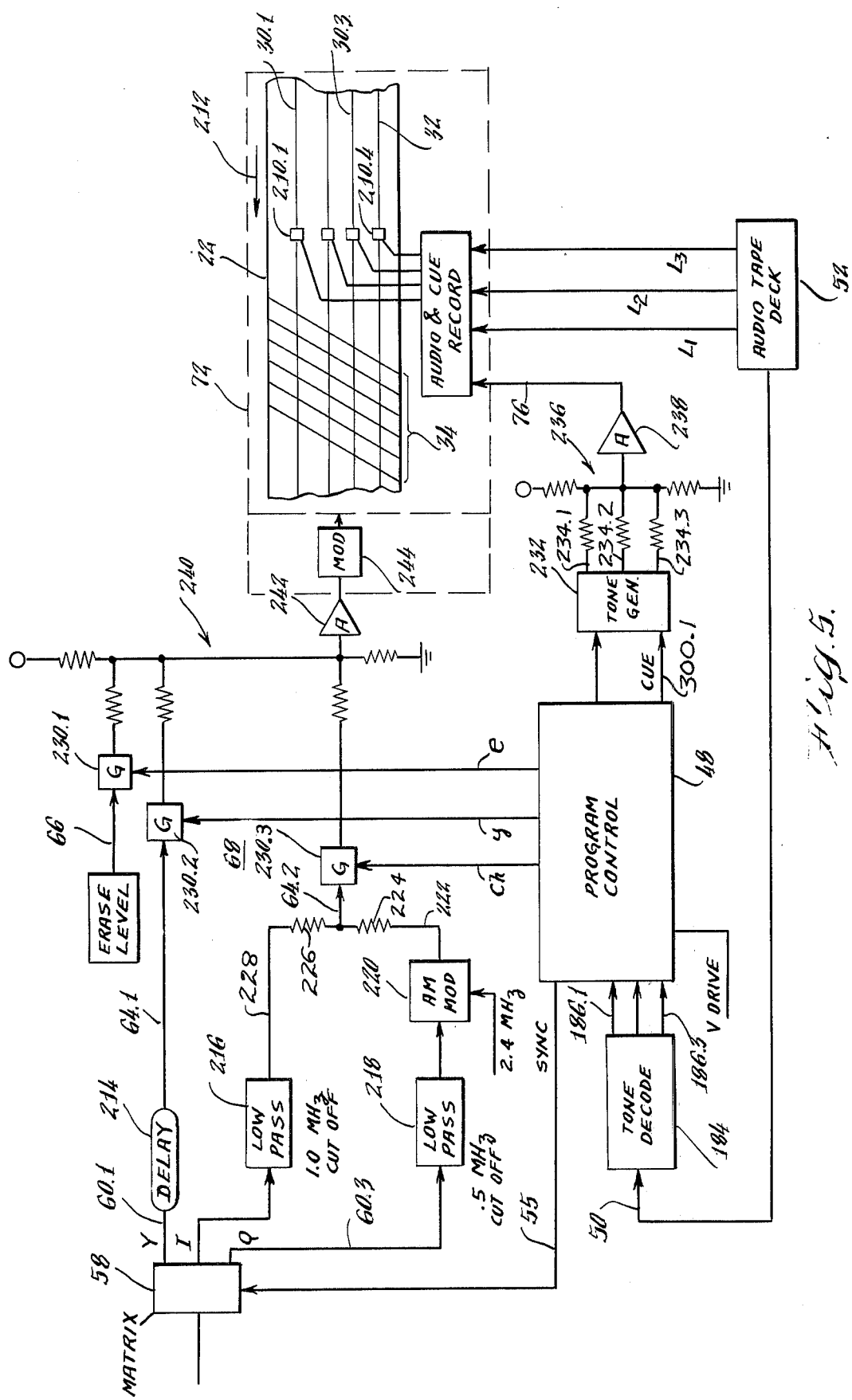
FIG. 5 is a more detailed block diagram view of a video still picture program tape composing system in accordance with the invention.

With reference to FIG. 5, he video recording composing apparatus of FIG. 1 has several of its networks shown in greater detail. The video tape recorder 72 is provided with four audio recording and playback heads 210 disposed opposite audio tracks 30. The audio recording heads 210 are located to record the audio segments of programs 132 in parallel tracks directly on video tape 22 while it is moving in the direction indicated by arrow 212. The audio heads are further so located that the audio is recorded prior to the video frames 34, which are recorded over the audio. Each video frame as previously explained is formed of six fields, the first two of which represent an erase field recorded at a black signal level. The subsequent four fields are formed in respective pairs of a monochrome Y signal and a chroma signal for recording of color information.

The matrix encoder 58 is formed of a conventional resistive matrix whose outputs are the Y, I and Q video signals on lines 60. The Y signal is applied in color processor 62 of FIG. 1 through time compensating delay network 214 to switch 68. The I and Q signals are respectively passed through a low pass filter 216, and a high pass filter 218. The Q signal further amplitude modulates a 2.4 MHz oscillator signal in modulator 220. The output 222 of modulator 220 is combined by series coupled resistors 224–226 with the output 228 from the I low pass filter 216 to generate and produce the chroma color television signal on line 64.2.

The program logic 48 generates y, ch and e timing video recording control signals applied to analog signal gates 230 to transfer the Y, Chroma, and Erase level video signals on lins 64.1, 64.2 and 66 to the video tape recorder 72. The program logic 48 generates the y, ch, and e timing control signals in response to cue signals played back on line 50 from the four track tape deck 52.

A tone decoder 184 is employed to enable regeneration of cue tones for recording on the video tape 22 with a proper timing relationship with video frames 34. The cue tones relating to the respective programs 132 (see FIG. 4) are regenerated with a tone generator 232 whose outputs 234 are combined with summing network 236 for recording on track 32 after amplification by amplifier 238. The outputs of sequentially enabled gates 230 are combined with a summing network 240 and then applied through a suitable amplifier 242 to a video tape modulator 244 for video recording on tape 22.

Since the cue tones on line 50 from the audio tape do not occur in synchronization with the vertical sync pulses (V drive pulses on line 55) used to record video frames, the program logic 48 provides proper synchronization. In addition, program logic 48 controls the response to cue tones from the four track tape deck 52 in order to provide slide projector 38 adequate time to change slides.

FIGS. 6, 7, 8 and 9

The operation of the video recording composing apparatus 24 may be further understood with reference to the timing diagram shown in FIG. 6. Vertical drive or sync pulses 260 (FIG. 6) are shown occurring at 1/60 second intervals. The source of the V drive pulses has been deleted since circuits for such pulses are well known. Since in the embodiment six fields (erase, Y and chroma) are used with each video frame, a total time of at least 1/10 of a second is used to record a still picture video frame 34 on video tape 22. Since the recorded video frames 34 are played back with the use of cue tones recorded on control track 32 of video tape 22, the recording of such cue tones occurs for one field period prior to the video fields to thus require a total recording time of seven fields or 7/60 of a second.

Hence, with reference to FIG. 7 and the timing diagram of FIG. 6, the V drive pulses are shown applied to a divide by seven network 262 which produces one for each seven input pulses four video enabling signals 263 in separate lines in the order of cue 264, e for the erase fields 266 (see FIG. 6), Y, 268, for the monochrome Y1 and Y2 fields and ch, 270, for the color chroma fields C1 and C2. In addition, a spike pulse 272 (see FIG. 6) occurs once every seven V drive pulses on line 274 (see FIG. 7) to drive a cycle control network 276.

Returning to FIG. 7, network 276 divides the pulses 272 by eight to generate eight distinct cycle timing pulses. As shown in FIG. 6, a first record cycle pulse 278 occurs on line 280 at the beginning of the full cycle and serves to enable a recording of cue signals on track 32 and erase, y and chroma fields. The record pulse on line 280 enables, as shown in FIG. 7, a AND gate 282 whose output 284 provides an enabling signal to AND gate 286 coupled to record enabling signals cue, e, y and ch on lines 263. AND gate 282, however, may be inhibited from producing an enabling output if a control flip-flop 288 in an ordering network 290 in FIG. 8 was not reset as signified by the enabling input of o on input line 292 to AND gate 282.

Cycle control network 276 further generates a second period "change slide" signal 294 on line 40 at an output of AND gate 286.5 to actuate the projector and advance it to project the next slide as soon as the record cycle 278 has terminated. An end spike pulse 296 (RE) on line 298 is generated at the end of the entire operational cycle or the eighth pulse 272 from network 262. The entire operational cycle thus requiring a time period of 56/60 of a second to complete. Enabling outputs on lines 300 from AND gates 286 are produced only one for each full cycle.

Since the cue tone signals along line 50, FIG. 1, from the audio tape deck 52 occur randomly, the recording of video frames on magnetic tape 22 in response to the cue tones must be done in an orderly manner and in the order the cue tones occur. Accordingly, the order network 290 shown in FIG. 8 is included in program control 48, FIG. 1, to regulate the order flip-flop 288, see FIG. 8, and thus the recording of video frames 34.

In order to explain the order network 290 reference is initially made to FIG. 9 where an operational diagram 320 is illustrated for network 290. The order network 290 is organized whereby the state of order control flip-flop 288 controls the recording of video frames 34. When flip-flop 288 is rest, any cue tone decoded by network 184 (FIG. 5), whether the cue tone relates to lesson 1, 2 or 3, is immediately responded to by recording a related video frame during the next occurring full operational cycle.

However, if another cue tone is detected from the audio four track tape deck 52 while the apparatus is seeking to respond to an earlier cue tone, then the order network 290 responds by controlling the operation in such manner that the earliest cue is first responded to followed by the next.

Hence, in normal operations when a number 1 cue signal 321.1 occurs (corresponding to a 3100 Hz cue tone) number 1 flip-flop 322.1 is set and order flip-flop 288 reset and the appropriate video frame recorded on video tape 22. At the end of the cycle associated with the recording of the video frame called for by cue tone 321.1, a end signal 324.1 is generated effectively from the number 1 flip-flop 322.1 and causes a reset of flip-flop 322.1 as well as the return of the order flip-flop 288 to a set state. Hence, further video frame recording is inhibited. If, at this time, another cue tone, for example a number 2 tone 321.2 (corresponding to a 4300 Hz cue tone) occurs, the system can immediately respond by honoring that last cue tone in the same manner as described. In the latter case, however, cue tone 321.2 caused flip-flop 322.2 to be set.

It may occur that while system 24 is recording a video frame called for by an earlier cue tone another cue tone is detected from the audio tape deck 52. For example, while system 24 is recording a video frame called for by a number 1 cue tone, a number 2 tone is detected from audio tape deck 52.

The occurrence of the number 2 cue tone causes a reset of the number 1 flip-flop 322.1 and a transfer control by setting a number 6 flip-flop 322.6. When the video recording called for by the earlier number 1 cue tone has been completed, as signified by end signal 324.6, the number 6 flip-flop 322.6 is reset and control is transferred to the number 2 flip-flop 322.2 by setting the latter. When the video recording called for by the later number 2 cue tone has been recorded, the number 2 flip-flop 322.2 is reset.

If, while honoring the number 2 tone signal, a number 3 cue tone 322.3 corresponding to a 5300 Hz cue tone occurs, then control is transferred from the number 2 flip-flop 322.2 to the number 5 flip-flop 322.5 and flip-flop 322.2 is reset. After the video recording called for by the number 2 cue tone has been completed, an end signal 324.5 causes a transfer of control to the number 3 flip-flop 322.3 to record the video frame called for by the last number 3 cue tone. In this manner, the video records and cue tone recordings are made in the order that the cue tones are played back from tape deck 52.

Implementation of the order control shown in FIG. 9 is shown in FIG. 8 wherein the detected cue tones from tape deck 52 are applied on lines 186 (see also FIG. 5) as number 1 tone or 3100 Hz, number 2 4300 Hz and 5300 Hz or number 3 cue tone. The cue tone lines 186 are respectively coupled to tone flip-flops 340 each of which has its set output line 342 coupled to three AND gates 344. The outputs of AND gates 344.1–344.3 are coupled through OR gates 346.1–346.3 respectively to the set inputs 348.1–348.3 of flip-flops 322.1–322.3. The other AND gates 344.4–344.9 are coupled to the set inputs of flip-flops 322.4–322.9 respectively. Each of the set outputs 350.1–350.9 of flip-flops 322 is coupled to cycle end signifying AND gates 352.1–352.9.

The interconnection of the described circuits for order network 290 is as indicated in FIG. 8 by the letter symbols shown on the respective circuit element input and output lines. Thus output end signal D on line 324.1 is coupled to reset flip-flop 322.1 through OR gate 354.1 as well as set order flip-flop 288 through OR gate 346.0. In a similar manner, for example, output signal B from AND gate 344.1 is shown coupled to reset order flip-flop 288 through OR gate 354.0 and set flip-flop 322.1 through OR gate 346.1

The set control signals produced from flip-flops 322.1–322.9 are further combined at OR gates 360.1–360.3 whose outputs 362.1–362.3 produce cue tones through AND gates 364.1–364.3 and end control pulses E1, E2 and E3 from AND gates 366.1–366.3. Tone generators 368.1–368.3 are actuated by AND gates 364 to provide the video tape control track 32 with the proper cue tone frequencies corresponding to the lessons 132.1–132.3 of FIG. 4. The RES lines are provided to assure reset of the logic at equipment start-up.

Operation of network 290 in FIG. 8 is as described with reference to FIG. 9. Thus, assume tone flip-flop 340.1 is set while the order flip-flop 288 is set.

This causes an enabling level from AND gate 344.1 to set flip-flop 322.1 and reset order flip-flop 288 by the action of the B signal through OR gate 354.0. When the next first recording cycle pulse 278 (see FIG. 6) occurs, a video frame is recorded. At the end of the entire cycle, an RE spike occurs to generate cycle end pulse signal E1. This in turn resets the tone flip-flop 340.1 and produces a D pulse from AND gate 352.1 used to reset the number 1 flip-flop 322.1 and set order flip-flop 288.

If, during the enable condition of the number 1 flip-flop 322.1 a number 2 cue tone occurs, then tone flip-flop 340.2 is set, and a pulse from AND gate 344.6 generated to set flip-flop 322.6 and reset flip-flop 322.1. Hence, after the first video recording is completed, a P end pulse is produced from AND gate 352.6, causing flip-flop 322.2 to be set. The second video frame can now be recorded and, upon completion produces end pulse G for a setting of order flip-flop 288 and reset of flip-flop 322.2.

This method of ordering and controlling the video single frame recording in response to randomly occurring cue tones can be repeated for all possible combinations of tone codes that may occur. Additional networks can be provided to enable one to properly order and control a larger number of tone codes for a larger number of still picture programs.

Figure 10:
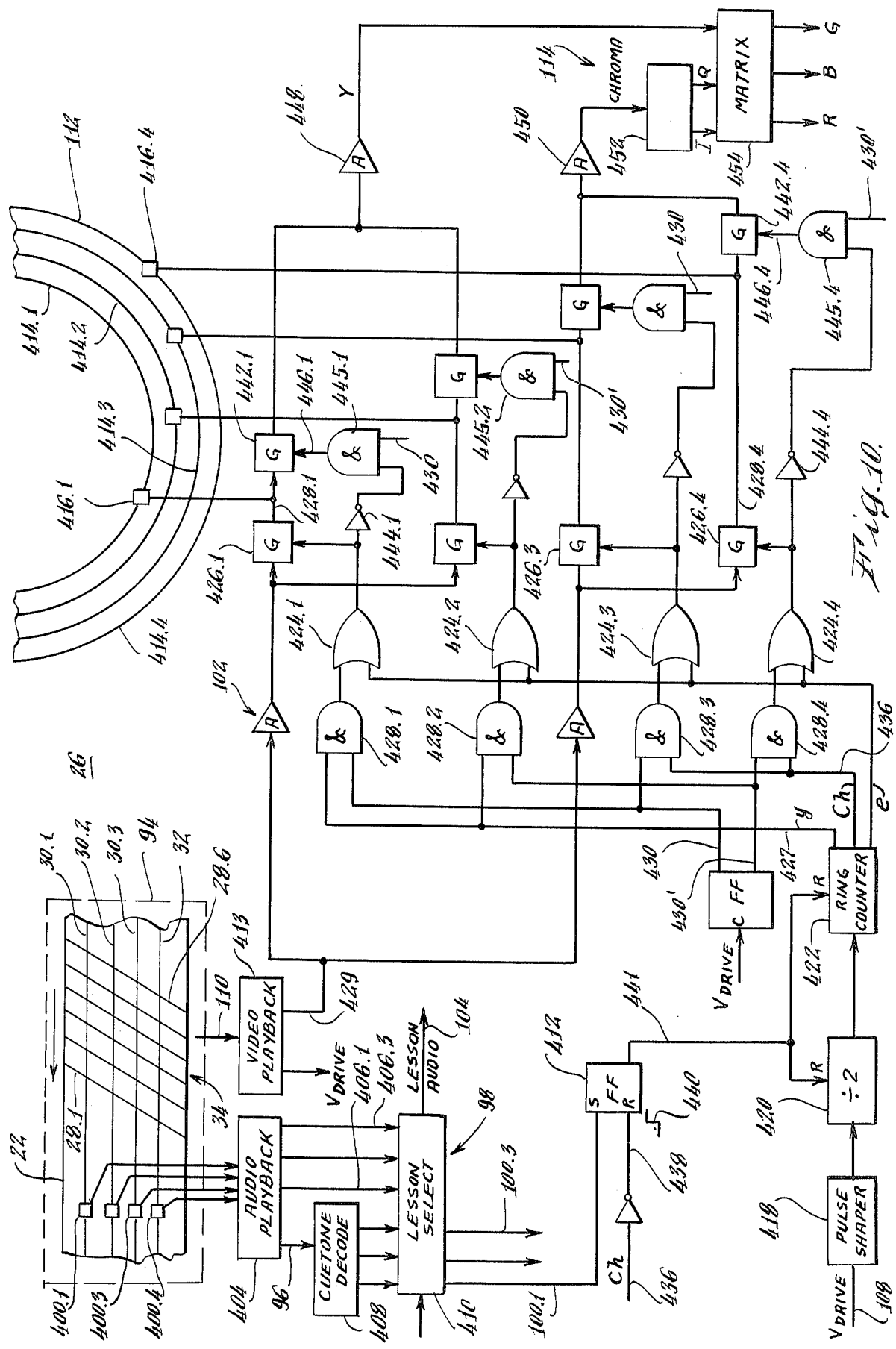
FIG. 10 is a block diagram and partial schematic view of a playback system for use with a still picture video recording formed in accordance with the invention.

FIGS. 10, 11 and 12

In the playback of the composed still picture video tape 22 formed with system 24, a conventional tape recorder and playback apparatus 94 is employed but modified to enable the detection of the audio information on audio tracks 30–32 as shown in FIG. 10. The video playback apparatus 94 may be Model IVC-700 as made by the IVC Company and is provided with audio heads 400 located ahead of the video detection head as suggested in FIG. 10 while the tape 22 is moving in the direction shown by arrow 402.

The audio outputs from heads 400 are applied to an audio playback network 404 which has suitable audio amplifiers and demodulators, if necessary, to provide audio program signals on output lines 406. Output line 406.4 carries the audio cue tones from audio control track 32 and is applied to a cue tone decode network 408. The network 408 generates cue pulses corresponding to each of the three lessons on three separate lines 100.1–100.3. A lesson select network 410 is interposed between the audio output lines 306 and the cue pulse lines 100 in order to enable the operator during playback to select a program he would like to listen to.

The lesson select network 410 is formed of switches connected to select one audio output of the three programs and enable one of the three cue pulse lines 100. Additional cue pulse output lines 100 are shown to emanate from network 410 to enable other operators, with additional switches to listen and observe selected still picture programs. The cue pulse on line 100.1 is applied to set a tone flip-flop 412.

During video playback each video frame detected by video playback network 413 and related to the selected still picture program is temporarily stored on an intermediate video frame storage device such as magnetic disc 112. Other temporary frame storage devices can be employed such as a drum or a tape loop, but in the particular embodiment a disc 112 is preferred.

The disc 112 is provided with at least four separate video tracks 414.1, 414.2, 414.3 and 414.4, each capable of storing a single field of video. Suitable video recording and playback heads 416 are located over tracks 414. Although four tracks 414 are shown for use in playing back one still picture program, it can be appreciated that additional disc tracks and heads can be and usually are available so that all three programs can be simultaneously played back.

The disc stores the monochrome Y1, Y2 and chroma, C1 and C2 fields on tracks 414.1, 414.2, 414.3 and 414.4 respectively. The erase fields are applied to each of the heads 416 to assure complete wipe-out of any previous video frame.

The video frame select logic 102 utilizes vertical drive pulses on line 108 and derived from the video playback apparatus 94. The V drive pulses are applied to a suitable pulse shaper 418 and then coupled to a divide by two network 420 (a flip-flop) and subsequently to a drive by three network 422 connected to form a ring counter. Both networks 420, 422 are reset by the tone flip-flop 412. The divide by three network 422 generates field timing signals, y, ch, and e whose durations correspond to the durations of the pairs Y, chroma and erase fields 28.1–28.4.

The first field timing signal is an erasure timing signal, $e$, which is applied through a set of OR gates 424 to enable four analog rf recording gates 426.1–426.4. The gate outputs 428 are applied to the video recording heads 416. The inputs to gates 426 are amplified video signals from output 429 of the video playback 413.

When the recording heads 416 are provided with the output from the video playback amplifier during the erasure timing, the tracks 414 are erased with a signal level corresponding to black as previously explained in connection with the composing apparatus 24 in FIG. 1. The erasure signal is applied for the duration of a pair of fields so that tracks 414 are cleared. Following the erasure mode, the first Y1 field is recorded on track 414.1. This is obtained by applying the y timing signal on line 427 to a pair of AND gates 428.1–428.2 together with respectively opposite outputs 430–430' from a divide by two flip-flop 432 driven by the V drive pulse. Hence, during the y enable signal one of the AND gates 428 is enabled at any one time. The outputs 434 from AND gates 428 are respectively applied through OR gates 424 to enable gates 426 and allow the Y fields to be sequentially recorded on disc tracks 414.1–414.2.

The chroma video information of a video frame 34 is recorded in a similar manner on tracks 414.3, 414.4 as the Y fields. In this case, the ch, chroma enable signal on line 436 is used to enable AND gates 428.3 and 428.4 whose outputs control analog gates 426.3 and 426.4. The recording mode is terminated by applying the inverse of the chroma enable signal ch to the reset input 438 of tone flip-flop 412. The reset input is selected sensitive only to a positive going wave shape as suggested by waveform 440. The reset output 442 of tone flip-flop is applied to reset inputs of networks 420, 422 to terminate the video disc recording cycle.

In addition to the recording of the video signals, appropriate vertical sync pulses may be recorded on a separate disc track to assure appropriate synchronization. During recording the vertical sync or drive pulses from the tape playback apparatus 94 are used to record on disc 112. During playback the vertical sync pulses recorded on the disc or from the disc recorded fields may be used to control the display of the video frame from the disc.

During playback and in the absence of a cue signal on line 100.1 from the video tape recorder 94, the networks 420, 422 remain reset, thus inhibiting outputs from AND gates 428 and preventing video signal gates 426 from recording information. At the same time playback gates 442 are enabled by applying the outputs of OR gates 424 through inverters 444 and AND gates 445 to the gating inputs 446 of gates 442. The outputs 430, 430' of flip-flop 432 are applied to AND gates 445 as shown to effectively switch gates 442 in a manner such that Y1 and C1 fields 28.3, 28.5 are played back simultaneously followed by the simultaneous playback of the Y2 and C2 fields 28.4 and 28.6.

The rf outputs of the Y field playback gates 442.1, 442.2 are combined at the input of the amplifier 448 and in a similar manner the outputs of the chroma field playback gates 442.1, 442.3 are combined at the input of an amplifier 450.

The rf chroma amplified field signals are then applied to a signal processor 452 to recover the I and Q signals. The Y, I and Q signals are then applied to a matrix decoder 454 to recover red, blue and green video signals R, B and G for high quality television display or converted to an NTSC signal for display on a conventional television set. Note that the video signals are in *rf* format throughout the described transfers.

FIG. 11 illustrates the signal processor 452 to recover the I and Q signals. The chroma signal from amplifier 450 is applied on input line 470. Since the I and Q signals were combined as explained with reference to FIG. 5, the I signal occupies a bandwidth of up to about 1 MHz and the Q signal occupies a half megahertz on either side of a 2.4 MHz carrier. Hence, in effect, the I and Q signals are frequency separated.

At the playback end as shown in FIG. 11 the reverse of the process of FIG. 5 is done. Thus the chroma signal is applied through a low pass filter 472 having a cut-off at about 1 MHz to reproduce the I signal on line 474. In addition, the chroma signal is applied through a band pass filter or high pass filter 476 having a cut-off at about 1.6 MHz to an amplitude demodulator 478. The output of the demodulator is in turn coupled through a low pass filter 480 for high frequency noise removal to produce the Q signal. An NTSC encoder 482 responsive to the I, Y and Q signals may then be used to produce a television signal on line 484 for display on a conventional television set.

When one desires to play back a plurality of still picture programs at one pass of video tape 22, a plurality of disc heads 416 can be used as shown in FIG. 12. Three cue tone flip-flops 412 are used, each responsive to a different cue tone. Each tone flip-flop 412 may then be used with a network such as shown and described with reference to FIG. 10 to play back video frames with the aid of AND gates 490.

FIG. 13

Figure 13:
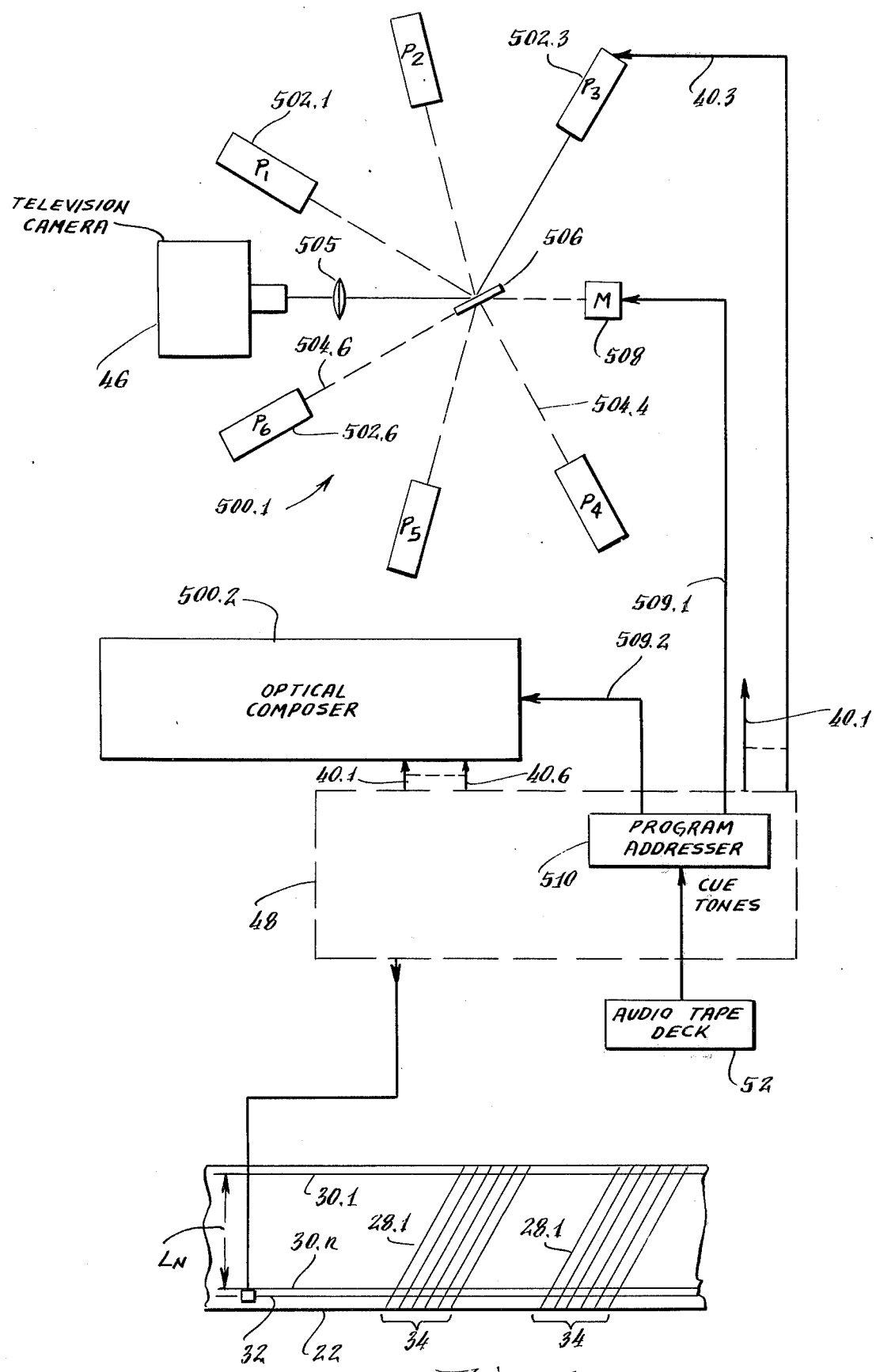
FIG. 13 is a block diagram view of an alternate slide projection and decoding system used to compose a still picture video recording in accordance with the invention.

In FIG. 13 a video tape composing system 24' is shown formed with a pair of optical composers 500.1, 500.2 operated under control by a network such as described with reference to FIG. 5. The composer system 24' produces a video tape 22 on which a large number, such as 12, of still picture programs have been recorded as suggested by the dashed line L.

Video tape 22 further includes video frames 34 of still pictures associated with the audio programs and are recorded and played back using the logic as described before. The video frames 34 are shown formed of six fields, though as previously explained, the Y and chroma fields may be recorded in combined form to achieve fewer fields.

Although a higher number of still picture programs are recorded on video tape 22, the resulting higher number of video frames 34 does not interfere with the audio tracks to a significant extent.

The composing system 24' organizes the slides in a preferably different manner from the method employed with the system described with reference to FIGS. 4 and 5. Thus, instead of interlacing slides of different programs to enable sequential recording and playback, the slides for each still picture program are arranged in their proper sequence in correspondingly separate automatically advanceable projectors 502.

There are six projectors 502 which are selectively oriented to project their optical beams 504 along predetermined paths onto a rotatable mirror 506. The mirror is automatically advanceable to six discrete positions each of which reflects a projector beam 504 onto television camera 46. A lens 505 is provided as needed for proper projection.

The mirror is movable to the six discrete positions with a remotely actuatable motor 508, such as a stepper motor, according to the number of pulses or control signals delivered thereto on line 509 from an address register 510 in control logic 48. The mirror is made with low inertia and its control is provided with sufficient damping that the mirror may be moved to its discrete positions in time periods measured in the order of about ten milliseconds. A mirror and mirror control capable of such high speed position changes may be such as described in a copending patent application entitled "System for Transferring Motion Picture Films to Video Recorders" filed by Kenneth Blair Benson on Jan. 18, 1974 with Ser. No. 434,607 now U.S. Pat. No. 3,919,474 and assigned to the same assignee as of this invention. Accordingly, control as described in the Benson copending application is incorporated herewith by reference.

When control network 48 identifies a cue tone from the audio tape deck 52, the still picture program to which the cue tone relates (for example projector 3) is recognized. In response to the decoded cue tone, control 48 produces a unique address code from addresser 510 causing mirror 506 to quickly move to the position as shown in FIG. 13 where projector 502.3 directs a slide into a camera 46.

After mirror motion terminates, i.e. after at least 10 milliseconds, and after control 48 has recorded a video frame of the slide projector 502.3, a slide change signal is applied along line 40.3 to projector 502.3. This enables the next slide to be recorded shortly after the next cue tone for that program has been played back from tape deck 52.

With the system 24' the slides of the programs can be kept separated in different projectors, permitting the deletion of the steps set forth at 182 and 190 in FIG. 4. Additional programs may be composed onto video tape 22 by use of an additional optical composer 509.2 addressed by addressor 510 in response to appropriate cue tones. Note that for a large number of still picture programs, a correspondingly wider or higher number of tracks must be accommodated by audio tape deck 52.

Figure 14:
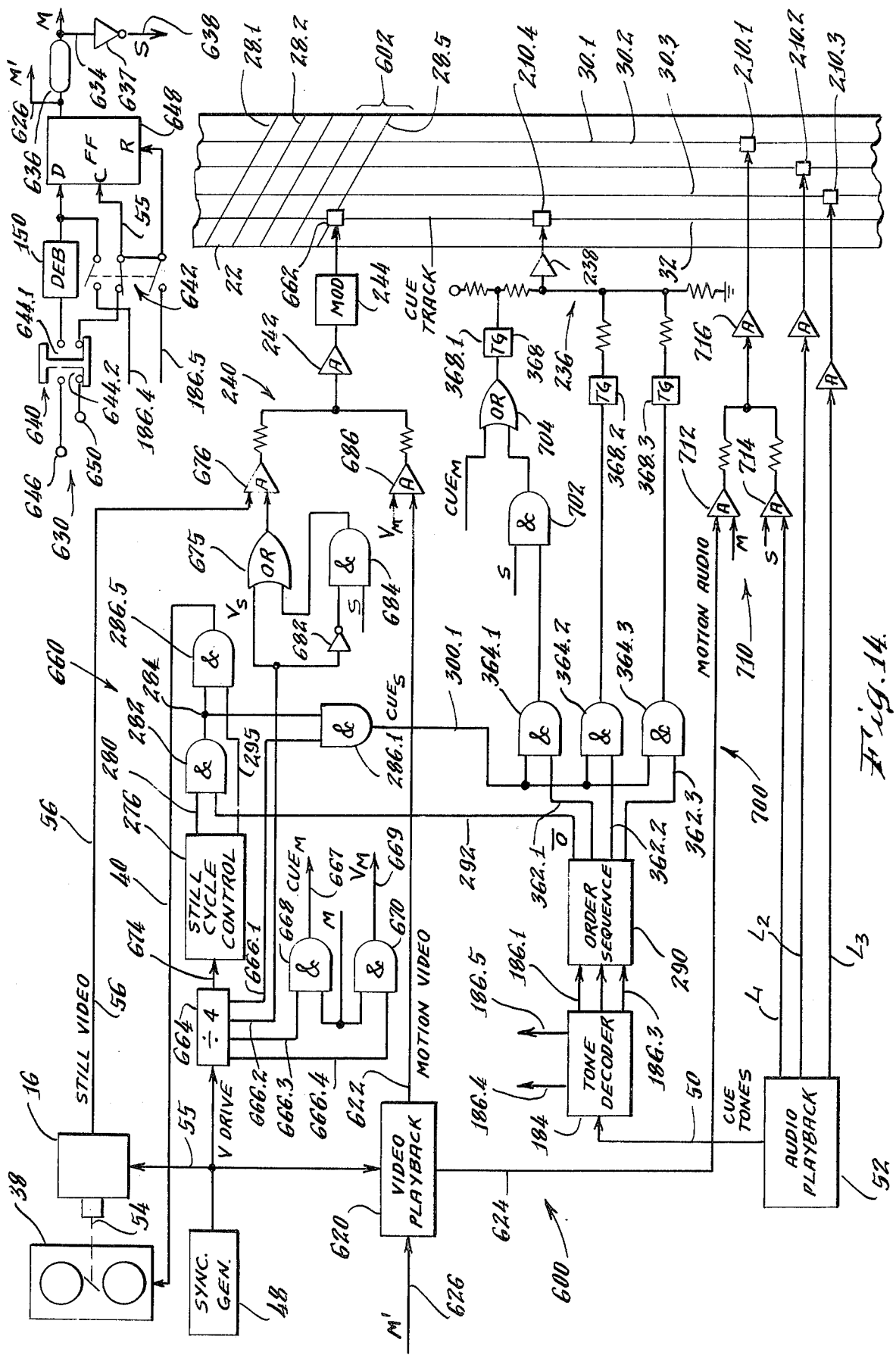
FIG. 14 is a schematic block diagram for a recording system of still picture programs with motion sequences.

DESCRIPTION OF FIGS. 14, 15 and 15A

Interlacing Motion Sequences With Still Picture Programs

With reference to FIGS. 14, 15 and 15A, a recording system 600 is shown for recording still picture programs with motion sequences.

As illustrated in FIG. 15A, video fields 28 are recorded on a magnetic medium 22. A pair of fields, such as 28.1 and 28.2 comprise a standard NTSC video frame 602 which is compatible for display on conventional video displays such as a home television set. Alternate odd-numbered frames 602, such as 602.1, 602.3 and 602.5 etc. are related to form a motion sequence.

Frames such as 602.2, 602.4 etc. are for storing a still picture related to a particular program or different programs. The even-numbered still picture frames 602.2 etc. are interlaced with the motion frames to enable changes of still pictures during a motion sequence. As a result, the motion sequences are stored at a rate of fifteen per second or one-half of the usual frame rate, 30 per second, employed for conventional displays.

In order to achieve the conventional display rate of thirty frames per second, the motion sequence is alternately played back from either a disc 604 or from the recording medium 22 by use of a rapidly cycled switch 606. During the time when a motion sequence frame, such as 602.1, is played back from the recording medium 22, the frame is applied along line 608 and through switch 606 in its position as shown to a display as well as recorded on video frame recording disc 604. During the playback of the subsequent still picture video frame 602.2, the switch 606 is cycled to enable only display of the previously recorded motion sequence frame 602.1. In this manner a motion sequence can be displayed for a particular program, while interlaced still picture frames for other programs are passed by.

The motion sequence is displayed at a reduced frame rate, which is sufficiently high to enable a realistic display of most motions with but a minor blurring of very rapid actions. For many practical applications the motion sequence display capability in accordance with the invention expands the versatility of still picture programs display.

Returning to FIG. 14, the recording system 600 is shown formed with networks, which are similar to those described with respect to previous Figures, and which are designated with identical numbers.

System 600 enables one to record on a common video tape the still pictures from still projector 38 for different programs and motion sequences from a video motion sequence source 620.

The motion sequence source 620 may be a video camera such as 16 to directly convert an action sequence into a video motion signal. Preferably, however, source 620 is a video playback apparatus as is commonly available. The motion sequence source 620 is driven by sync source 48 to operate in synchronization with camera 16. The video motion signal is produced on output line 622 and the associated motion audio is generated on output line 624.

The motion sequence source may be actuated by delivering a signal, M', to an input line 626. This signal initiates the playback of video motion signals at a time determined by listening to the playback audio of a program from audio playback apparatus 52. An operator may initiate and terminate the playback of a video motion sequence or this can be done automatically as will be explained with respect to network 630.

Control signals are generated with a network 630 to determine whether a still picture or motion sequence is to be recorded on video tape 22. Network 630 produces motion control signals M' on line 626 and M on line 634 representative of when a motion sequence is to be recorded. M occurs after a delay following M' by use of a delay network 636 to allow video playback source 620 to become synchronized with synch generator 48.

A still picture control signal, S, is obtained on line 638 as the inverse of M, by use of an inverter network 637 whose input is coupled to line 634. Hence, when there is no need for a motion sequence, video frames 602 corresponding to a still picture displayed by projector 38 are recorded on video tape 22.

Network 630 produces the motion control signals, M, M' and still picture control signal S, either with a manually controlled push button switch 640 or automatically in response to cue signals decoded by network 184 coupled to the audio playback device 52.

In the manual mode a three-pole mode selector switch 642 is in the position as shown and disables the automatic mode. The push button switch 640 controls two pairs of switches, a normally open switch 644.1 and a normally closed switch 644.2. The first switch 644.1 generates an enable signal from a voltage source 646 to a switch debouncer network 150. The output of the latter in turn is coupled to set a flip-fop 648 whenever a V drive clock pulse occurs on the clock input, C, of flip-flop 648.

Hence, as long as push button switch 640 is manually activated, motion control signals M' and M are produced by flip-flop 648 while the still picture control signal, S, is disabled. When the desired motion sequence has passed, the push button switch 640 is released to thus enable a signal from a voltage source 650 to pass through motion control switch 644.2 and the closed pole of mode control switch 642 to the reset input, R, of flip-flop 648. The reset of flip-flop 648 disables the motion control signals M' and M while the still picture control signal S on line 638 is enabled.

In the automatic mode, switch 642 is thrown into its alternate position whereby the reset output of manual switch 640 is disconnected from the reset input R of flip-flop 648 and the set and reset inputs, D and R of flip-flop 648 in turn are controlled by cue signals decoded by tone decoder network 184 on lines 186.4 and 186.5. Network 184 decodes special audio frequencies selected to respectively correspond to a motion sequence start signal on line 186.4 to set flip-flop 648.

The motion sequence and still picture control signals, M and S from network 630 control both the audio and video signals, which are to be recorded on video tape, as well as cue signals recorded on audio cue control track 32. In the recording system 600, video information is continuously recorded so that a full pattern of video fields 28 are formed on tape 22.

An advantage in filling all of the available frame slots on video tape 22 is that, during playback, accurate synchronization can be maintained with the signal levels in the playback apparatus being stabilized at their proper level throughout the playback mode.

The cue signals recorded on track 32 are then employed to determine whether a particular video frame 602 is to be displayed. Hence, for a motion sequence, which is formed of a large number of frames, as many cue signals are recorded on track 32 at a time and place selected to enable each video frame following the cue signal to be played back. In addition, the slots between successive motion sequence video frames are occupied by still picture video frames. The latter frames, however, will only be played back if a corresponding cue signal was recorded on track 32.

In the composing system 600, a video control section 660 is provided to supply the video recording head 662 with video signals. The control section 660 includes a divide by four network 664, which produces various signals on output lines 666.1–666.4 in response to vertical synch pulses on input line 55.

A first signal produced on line 666.1 is a cue pulse of one video field duration at a rate of once for each four vertical synch pulses. This cue pulse is used to produce a still picture cue recording pulse, $CUE_s$ on line 300.1 from AND gate 286.1.

A second signal, $V_s$, produced on line 666.2 from network 664 is a still picture enable pulse with a duration of two fields or one video frame and occurs right after the cue pulse on line 666.1. The pulse on line 666.2 is applied through OR gate 675 to enable an analog switching amplifier 676. An example of the relative durations and timing relationships of the still picture cue signal, $CUE_s$, and still picture enable pulse $V_s$, is illustrated in the timing diagram of FIG. 15.

A third signal, produced on line 666.3 from network 664 occurs at a time and for a duration of one field as illustrated in FIG. 15 for the motion cue signal, $CUE_m$, during a motion sequence. The motion cue signals $CUE_m$ occur at a rate of one-fourth of the V drive pulses or at a frequency of 15 Hz at the output 667 of an AND gate 668 enabled by the motion sequence control signal, M, as shown in FIG. 14.

A fourth signal produced on line 666.4 from network 664, is used to generate a motion video enable signal with a duration of two fields or one video frame, and occurs right after the motion cue pulse on line 666.3. A motion video enable pulse, $V_m$, is derived on output 669 from AND gate 670 enabled by the motion control signal M. The pulse, $V_m$, occurs at a rate of 15 Hz and at a time as illustrated in the timing diagram of FIG. 15. The pulse on line 669, $V_m$, is applied to enable an analog logic amplifier 686. Video signals from amplifiers 676 and 686 are summed in amplifier 242 whose output is applied to modulator 244 for recording these signals on magnetic tape 22.

Network 664 further produces a drive pulse on line 674 once every four vertical synch pulses. The pulse on line 674 occurs at the start of each pulse on output line 666.1 to drive cycle control network 276. The latter produces a still picture record enabling signal 278 on line 280 at a time and for a duration as shown in the timing diagram of FIG. 15. In addition, other control signals such as the change slide pulse 294 on line 295 is generated by network 276.

A logic interlock is obtained to synchronize and order the recording of video frames with cue signals played back from the audio tape in a manner as previously described with reference to FIGS. 7, 8 and 9.

Thus, an order control signal o from order sequence control network 290 is shown in FIG. 14 applied to AND gate 282. When a cue tone is decoded by network 184, order control signal $\overline{o}$ on line 292 occurs to allow a cue signal for a still picture to be recorded by enabling AND gate 286.1 as previously described.

The still picture enabling signal $V_s$ is applied through OR gate 675 to an analog switching logic amplifier gate 676 together with the video output on line 56 from camera 46. $V_s$ occurs continually, as shown in FIG. 15, so that still picture frames are correspondingly recorded on video tape 22 through video combiner network 240, amplifier 242, modulator 244 and head 662. Since $V_s$ occurs at a time which is in between the intervals of $V_m$, as shown in FIG. 15, still picture video frames are recorded in an interlaced manner with motion sequence video frames.

Since it is desired to maintain a fully recorded video tape, the slots 680, see FIG. 15, occurring between still picture frame enabling signals $V_s$ when the still picture control signal S is active are also filled with still picture video frames. This is accomplished by applying the $V_s$ signal through an inverter 682 to an AND gate 684 which is enabled by still picture control signal S. The output of AND gate 684 is coupled through OR gate 675 to enable analog logic gate 676.

When a motion sequence is to be recorded, the motion sequence enabling signal $V_m$ enables an analog logic switching amplifier 686 having another input coupled to the video output on line 622 from video playback source 620. In this manner motion sequence video frames are recorded on video tape 22 during time intervals determined by signal $V_m$. The slots 681, see FIG. 15, between the active segments of the motion sequence enabling signal $V_m$ are filled with still picture frames. The interlaced recording of still picture frames during the recording of a motion sequence is obtained through the action of the still picture enabling signal $V_s$ coupled to analog gate 676.

Since the playback of video frames is to be controlled by cue signals recorded on track 32, cue signals are recorded by system 600 as frequently as different video frames are to be played back. Hence, during a motion sequence, cue signals are recorded at the same rate as their associated motion sequence video frames but at a time as previously explained with reference to waveforms 667 and 669 in FIG. 15.

The recording of cue signals for both still and motion sequences is obtained as shown in FIG. 14 with a cue control section 700. Section 700 includes, as previously described, the tone decoder 184, the order sequence network 290 and separate program cue signal generating gates 364.

In operation, for example, the audio playback apparatus 52 produces cue tones which are decoded as cue signals on lines 186. The order network 290, as described with reference to FIGS. 7, 8 and 9, assures that the cue signals are recorded on track 32 in the order which slides in projectors 38 are arranged.

In the event a cue signal associated with a first program occurs, then AND gate 364.1 is enabled by a signal on line 362.1 at the proper time to produce an output to an AND gate 702. The latter, in turn, is enabled by the still picture control signal S to deliver through an OR gate 704 a signal to tone generator 368.1 for recording a cue pulse $CUE_s$ on track 32 as shown in FIG. 15 with waveform 300.1.

When the tone decoder 184 identifies a tone code corresponding to a call for a motion sequence, a signal on line 186.4 occurs to set flip-flop 648 in control network 630 when the next clock or vertical sync pulse occurs. Note that in this operation, mode switch 640 in network 630 is set in the automatic position, disabling control from manual switch 640 while enabling control by lines 186.1 and 186.2. This signal on line 186.1 enables sequence control signals M and M' while control signal S is disabled. Signal M' is effective to cause the video playback source 620 to provide synchronized video signals on line 622 while signal M causes the recording of motion sequence video frames on tape 22.

With the still picture control signal S disabled, the motion control signal M enables an AND gate 668 to allow motion sequence cue signals $CUE_m$ from AND gate 668 to pass through OR gate 704 for recording on track 32.

The recording of motion sequence cue signals $CUE_m$ continues at a rate of 15 Hz as explained with reference to waveform 667 in FIG. 15. Each recorded cue signal, $CUE_m$, is immediately followed by the recording of a motion video frame 602 as shown by the enabling waveform 669 for $V_m$ in FIG. 15. When tone decoder 184 identified an end of motion sequence tone, a signal on line 186.5 occurs to reset flip-flop 648 in control network 630 and thus terminate the recording of motion sequence tones $CUE_m$ on track 32.

The motion control signals M and S are further used in an audio control section 710 to determine whether audio signals from audio playback apparatus 52 or from the motion video playback machine 620 are to be recorded on track 30.1. Thus, the M and S control signals are shown respectively coupled to analog gates 712, 714, together with the audio on line 624 from video motion playback machine 620 and the audio on line L1 from audio playback device 62. The outputs of analog gates 712 and 714 are combined and applied through a suitable recording network 716 to audio recording heat 210.1.

In summary, with the video program composing system 600 of FIG. 14, both still picture and motion sequences may be combined on a common storage medium such as video tape 22. The cue signals on the video control track are recorded to determine when different video frames are to be played back.

The system 600 is described with networks and controls to enable the recording of a motion sequence for one program. It can be appreciated by one skilled in the art that the principles of this invention may be employed to record motion sequences for additional programs.

Description of Still and Motion Playback System FIGS. 16 and 17

With reference to FIGS. 16 and 17, a video playback system 750 is shown for a video tape 22 carrying video and audio signals as recorded with the composing system 600 described with respect to FIGS. 14, 15 and 15A. In the description of system 750 of FIG. 16, devices which have been previously described with respect to other Figures such as for the playback system of FIG. 10, and which have similar functions are denoted with like numerals.

Audio information, including cue signals, are detected with audio heads 400 with the audio information of a selected program being supplied on line 104 and decoded cue tones provided on line 100.1

Video frames 602 are detected with a video playback apparatus 413 having a helical scan video playback head. The playback apparatus 413 generates video frame signals on line 608 and control signals such as vertical sync pulses 752 (see FIG. 17) on line 754 and tech pulses 756 (see FIG. 17) on line 758.

The tech pulses are obtained in a conventionally available video playback machine from the rotational mechanical (not shown) employed to drive the helical scan video playback head. The detection device used to generate the tech pulses is located so that the tech pulses 756 occur at the same frequency as the V drive pulses 752, but midway between them as shown in the timing diagram of FIG. 17.

The video frame in radio frequency modulated form are delivered on line 608 through an analog gate 426.1 for recording on a track 414.1 of a video frame recording disc 604. In addition, a video frame 602 is to be continually displayed on a conventional video display such as 760.

Accordingly, the video frame signals on line 608 are further applied to an analog signal gate 762 whose output 764 is combined with the output 766 of an analog playback gate 442.1 to drive a demodulator 770. The output of demodulator 770 provides a display 760 with suitable video frame signals for display.

Control of switch network 606 is obtained with a cue switch network 772. The cue pulses derived on line 100.1 are applied to a flip-flop 774 which is set when the next successive tech pulse on line 758 occurs.

The tech pulses are applied to a delay 776 selected in duration to provide clock pulses which are in sync with the vertical drive pulses 752. The delayed tech pulses are coupled to clock inputs of flip-flops 778 and 780, both of which have their outputs 782, 784 set at the time as illustrated in FIG. 17.

The outputs 782 and 784 of flip-flops 778, 780 are combined with an OR gate 786 whose output is applied to control analog gates 426.1, 762 as well as analog gate 442.1 through signal inverter 788.

In operation the playback apparatus 750 is initially placed in the playback mode with a suitable mode switch, not shown, but which may be part of the video playback apparatus 413. The mode switch provides a control signal on line 790 through an inverter 792 to the reset inputs, R, of flip-flops 744, 778 and 780. Hence, with apparatus 413 in other than the playback mode, the latter flip-flops are held in their reset stage to this inhibit enabling signals to the analog gates 426.1 and 762. When apparatus 413 is in the playback mode, the inhibit condition from line 790 is disabled.

Without an enabling signal on line 787 from Or gate 786, the output of inverter 788 provides analog gate 442.1 with an enabling input. Hence, video frames are played back from disc 604 and shown on display 760 when network 772 is in a reset state.

As the video tape 22 is played back, cue signals are decoded and when a motion sequence occurs, will appear on line 100.1 at a rate of 15 Hz as illustrated in FIG. 17. The cue signals normally occur in sync with the vertical sync pulses and for periods of one video field.

A cue signal such as 101.1 is followed by a tech pulse 756.1 during the middle part of the cue signal to set flip-flop 774 as shown with waveform 775 in FIG. 17.

Some time later, at the end of delay 776 and effectively in sync with the vertical drive pulses, output of flip-flop 778 is set to produce an enable signal from OR gate 786 as shown with waveform 787 in FIG. 17.

The next tech pulse 756.2 causes flip-flop 774 to be reset since the enabling cue signal on line 100.1 has terminated. When the delayed form of tech pulse 756.2, or pulse 756.2', emerges from delay 776 on its output 777, flip-flop 778 is reset, because of the previous removal of the enabling state at input D of flip-flop 778. Flip-flop 780, however, it set by pulse 756.2' and reset by the next successive delayed tech pulse 756.3' to produce pulse 791.1 as shown with waveform 784 in FIG. 17.

The resulting output pulse from OR gate 786 is a pulse 794.1 as shown on waveform 787 in FIG. 17 with a duration of one video frame or two fields commensurate in time with the video frames being played back on line 608.

When pulse 794.1 initially went active, the playback gate 442.1 was disabled while recording analog gate 426.1 and bypass analog gate 762 were enabled. In this manner the video frame occurring during pulse 794.1 is both recorded on track 414.1 of disc 604 and made available for display through bypass analog gate 762.

Suppose the cue pulse 101.2 is the last in a motion sequence and is immediately followed by a cue pulse 101.3 representative of a still picture to be continuously displayed.

In such case, flip-flop 774 (line 775) is shown being set with tech pulse 756.7 and flip-flop 778 with the delayed tech pulse 756.7'. Pulse 756.8 resets flip-flop 774, while the delayed pulse 756.8' resets flip-flop 778 and sets flip-flop 780. The next successive delayed pulse 756.9' resets flip-flop 780. The result is an enable pulse 794.2 from OR gate 786 as shown with waveform 787 in FIG. 17. Hence, in this manner the still picture video frame identified by cue pulse 101.3 is recorded on disc 604 and thereafter available for playback.

With the playback system 750, each cue signal on video tape track 22 is identified. If the cue signal is related to a selected program, the immediately following video frame is recorded on disc 604 and available for playback. Motion sequences are extracted from the video tape and alternately recorded on and played back from disc 604 to provide continuous action.

Having thus explained a still picture video composing and playback apparatus and a system for recording and playing back both still pictures and motion sequences in accordance with the invention, its advantages can be appreciated. A large number of still picture video programs can be composed and played back from a common video recording. High resolutions can be achieved by separately recording a wide bandwidth monochrome Y signal and wide bandwidth color signals. The cue tones have been described as being located on a separate control track. It is possible to incorporate the cue tones with the audio tracks in the form of unique pairs of frequency signals when such approach appears desirable.

What is claimed is:

1. A system for producing a video recording of a plurality of video programs formed of still pictures with associated audio comprising audio composing means for producing a magnetic audio recording of a plurality of audio programs of individually determined duration with identifiable cue signals located to indicate when still pictures related to the audio programs are to be displayed;

means for playing back the audio programs and cue signals from the audio recording;

a video recorder to form said video recording on a video storage medium;

audio recording means for simultaneously recording the plurality of played back audio programs on respectively separate tracks on the video storage medium;

means actuated by the played back cue signals for recording video frames representative of still pictures for the audio program on said video storage medium in a sequence determined by the recording order of the plurality of audio programs on the video storage medium; and means responsive to the played back cue signals from the audio recording for identifying the video frames recorded on the video storage medium and initiate recording of successive video frames thereon.

2. The system for producing a video recording of still picture programs as claimed in claim 1 wherein the video frame identifying means further includes means responsive to the played back cue signals from the audio recording for generating video frame identifying cue signals and means for recording the video frame identifying cue signals along the video storage medium on a separate track thereof and at locations selected to enable playback of video frames related to a selected audio track.

3. The system for producing a video recording of still picture programs as claimed in claim 1 wherein the video frame recording means further includes means for playing back a motion video sequence formed of a plurality of video motion frames related to a predetermined program; and means for interlacingly recording the video motion frames with the video frames representative of the still pictures of other programs on the video storage medium to provide a video recording carrying a combination of still picture programs with a motion sequence.

4. The system for producing a video recording of still picture programs as claimed in claim 3 wherein the interlacing recording means includes means for producing motion cue signals representative of the video motion frames to be recorded; and means responsive to the motion cue signals for recording the video motion frames.

5. A system for recording and playing back video programs formed of still pictures and motion sequences with associated audio comprising means for composing a composite video storage medium carrying a plurality of audio program tracks and respectively associated video frames representative of a motion sequence and still pictures for different programs with the program related video frames being identified on the video storage medium, the motion sequence video frames being alternately interlaced with still picture video frames to enable the playback of still pictures requiring display during the motion sequence and related to a different program;

means for playing back and storing a video frame from the video storage medium to enable continuous display of a program recorded on the video stroage medium;

means for playing back and selecting the audio on the video storage for projection with associated video frames;

means responsive to video frame identifying signals from the video storage medium for generating a playback control signal representative of the intervals when video frames related to a selected program are being played back from the composite video storage medium and means actuated by the playback control signal for enabling display of video frames during playback of the video storage medium and recording a video frame on the video frame storing means during said intervals while enabling display of a video frame from the video frame storing means during time periods between said intervals to enable smooth display of a motion sequence compatible with the display of still pictures related to the selected program.

6. The system for recording and playing back video programs as claimed in claim 5 wherein the composing means further includes means for producing cue signals respectively representative of still picture video frames and motion sequence video frames; and means for recording the cue signals on the video storage medium at a time and place selected to enable identification and playback of the video frames on the video storage medium.

7. The system for recording and playing back video programs as claimed in claim 5 wherein the means for composing further includes means for producing video frame signals representative of a still picture;

means for producing video frame signals representative of a motion sequence;

means for producing still picture and motion sequence control respectively representative of when a still picture and a motion sequence are to be recorded on the video storage medium; and control means responsive to said still picture and motion sequence control signals for recording said video frame signals representative of a still picture and a motion sequence in alternate relationship on the video storage medium.

8. The system for recording and playing back video programs as claimed in claim 7 wherein said composing means still further includes an order sequence control network coupled to separate video frame signals representative of still pictures in time and with a desired recording priority order thereof.

9. A method for composing a plurality of still picture programs on a common video storage medium with the programs being formed of video frames and related audio information comprising the steps of recording a plurality of different audio programs of individually determined duration on respectively separate and parallel audio tracks on the common video storage medium, wherein the audio tracks have sufficient length to store audio programs of substantially different durations; and recording video frames representative of still pictures for the respective programs on the common video storage medium with video frame identifying signals selected to identify video frames related to different still picture programs, said video frames being recorded on video tracks which are distinct from said audio tracks.

10. The method for composing a plurality of programs on a common video storage medium as claimed in claim 9 wherein the video frames recording step further includes the steps of generating video frames representative of still pictures related to the programs;

generating video frames representative of a motion sequence for at least one of the programs; and recording the still picture motion sequence video frames in alternate relationship with still picture video frames of the common video storage medium.

11. The method for composing a plurality of programs on a common video storage medium as claimed in claim 10 wherein the step for recording the video frames further includes the step of recording cue signals on an audio track in synchronization with the video frames for said still picture and motion sequence at a relative position selected to enable timely recognition and playback of the video frames.

12. A method for composing a plurality of programs on a video storage medium with the programs being formed of still pictures accompanied by audible information comprising the steps of recording a plurality of audio programs of individually determined duration on separate tracks on an audio storage medium;

recording decodable cue signals individually representative of a still picture on the audio storage medium at locations selected to correspond with desired displays of still pictures for the respective audio programs;

arranging projectable slides of the still pictures for the programs in a projectable sequence determined by the order of occurrence of the still pictures for all of the audio programs as these are recorded on the audio storage medium;

playing back the audio programs and cue signals recorded on the audio storage medium;

projecting the slides in corresponding sequence with the playback of the audio programs and cue signals;

forming video frames of the projected slides in the order determined by the played back cue signals; and recording the audio programs, cue signals and video frames on a common video storage medium.

13. A method for composing a plurality of still picture programs on a video storage medium with the still picture programs being formed of video frames and associated audio information comprising the steps of composing an audio magnetic medium with a plurality of audio programs of individually determined durations and decodable cue signals located to determine desired times in the audio programs when a still picture related to a program is to be displayed;

playing back the audio magnetic medium to record the audio programs onto respectively individual audio tracks on the common video storage medium;

decoding cue signals from the audio magnetic medium;

generating video frame signals representative of still pictures for the programs in response to cue signals decoded from the audio magnetic medium; and simultaneously recording video frame signals with video frame identification on the common video storage medium along with the played back audio programs to compose said plurality of programs thereon whereby the video frames are identifiably located on the video storage medium for display as associated still picture programs may require.

14. The method for composing a plurality of programs on a video storage medium as claimed in claim 13 wherein the step of generating the video frame signals further includes the steps of forming still picture video frame signals and motion sequence video frame signals; and wherein the recording step further includes the step of recording the still picture and motion sequence video frame signals in an interlaced manner on the common video storage medium to enable rapid sequential playback of motion sequence video frames.

15. The method for composing a plurality of programs on a common video storage medium as claimed in claim 14 wherein the recording step still further includes the steps of selecting decoded cue signals representative of a desired motion sequence for a program; and recording the motion sequence on the common video storage medium at a time and for a duration determined by the decoded cue signals representative of the motion sequence.

16. The method for composing a plurality of programs on a common video storage medium as claimed in claim 13 wherein the video frame generating step further includes the steps of arranging projectable slides of the still pictures for the programs in a projectable sequence determined by the order of occurrence of still pictures for the plurality of audio programs as these are composed on the audio magnetic medium;

identifying the decoded cue signals from the audio magnetic medium to determine which program the decoded cue signals relate to; and responding to the decoded and identified cue signals in the order with which the slides are arranged in the projector to form video frame signals with video frame identification for recording on said common video storage medium.

17. The method for composing a plurality of still picture programs on a common video storage medium as claimed in claim 16 wherein the responding step further includes the steps of storing the decoded and identified cue signals; and responding to the stored cue signals to generate said video frame signals in the order in which the cue signals are decoded from the audio magnetic medium.

18. A system for composing a video recording of a plurality of video programs formed of still pictures with associated audio comprising audio composing means for producing a magnetic audio recording of a plurality of audio programs of individually determined duration with decodable cue signals located to indicate when still pictures related to the audio programs are to be displayed;

means for playing back the audio programs and cue signals from the audio recording;

slide projecting means effectively responsive to the played back cue signals for projecting a plurality of slides respectively representative of the still pictures in the programs and in sequence determined by the recording order of the plurality of audio programs on the audio recording;

a video tape recorder to form said video recording on a video tape;

a video camera located to form video frames of the slide projections for recording on said video tape;

audio recording means for recording the plurality of audio programs on respectively separate tracks on the video tape; and program control means responsive to the played back cue signals from the audio recording for identifying the video frames on the video recording and initiate sequential slide projection.

19. The system for composing the plurality of programs on a common video recording as claimed in claim 18 and further including a video tape playback apparatus for producing motion sequence video frames related to a program; and interlacing means for enabling the recording of the still picture video frames from the video camera in alternate relationship with motion sequence video frames from the video tape playback apparatus on the video tape.

20. The system for composing the plurality of programs on a common video recording as claimed in claim 19 wherein the interlacing means generates a motion sequence control signal and a still picture control signal to respectively determine whether a motion sequence or a still picture for a video program is to be recorded on the video tape; and analog logic networks effectively interposed between the video tape playback apparatus, the video camera and the video tape recorder, said analog logic networks being operated by the control signals to correspondingly record the still pictures and motion sequence on the video tape in the video tape recorder in alternate relationship.

21. The system for composing a plurality of still picture programs with audio narration on a common video recording as claimed in claim 18 wherein said audio recording means is provided with a plurality of audio heads arranged to record audio narration on parallel tracks on the video tape;

wherein the audio composing means includes a multiple track audio tape deck coupled to transfer audio narration onto the video tape through said audio heads and provide cue tone signals representative of when a still picture for an audio program narration is to be displayed;

wherein the program control means further includes means for coupling the video frames to the video tape recording to record video frames of said slides on the video tape; and enabling means responsive to the cue signals from the audio tape deck for producing enabling signals to the coupling means to recording video frames on the video tape.

22. The system for composing a plurality of still picture programs as claimed in claim 18 wherein said projecting means is formed of a plurality of slide projectors which are selectively aligned to enable to project slides onto the video camera;

means selectively directing the projected slide of any one of the projectors on the video camera; and means responsive to the cue signals from the audio composing means for controlling said slide projection directing means.

23. The system for composing a plurality of still picture programs as claimed in claim 18 and further including means for generating a monochrome Y video signal separate from a chroma color video signal of each of the projected slides; and means for enabling recording a video frame formed of separate video fields for said monochrome Y and chroma color video signals for each of the projected slides.

24. The system for composing a plurality of still picture programs as claimed in claim 21 wherein said enabling means further includes order means effectively responsive to the cue signals from the audio tape deck for producing video frame recording enabling signals with video frame identification in the order of the cue signals being played back from the audio tape deck, with the video frame recording enabling signals being in synchronization with the video tape recorder.

25. The system for composing a plurality of still picture programs as claimed in claim 24 wherein the order means still further includes storing means for storing cue signals from the audio tape deck;

an order control network coupled to respond to the cue signals from the audio tape deck and to generate order enabling signals in the order of the arrival of cue signals from the audio tape deck, said order enabling signals signifying the ability to record a video frame in response to a cue signal from the audio tape deck; and means controlled by the order control network to effectively produce said video frame recording enabling signals with video frame identification in the order in which the cue signals were stored.

26. The system for composing a plurality of still picture programs as claimed in claim 25 wherein the program means further includes means for repetitively generating video frame recording enabling signals; and cycle control means for producing a recording cycle signal to select a set of video frame recording enabling signals for video frame recording upon the generation of an order enabling signal.

27. A system for composing a plurality of audio narration programs for projection with the display of still pictures on a common multiple track audio tape comprising a multiple track audio tape recorder and playback apparatus sized to retain an audio tape capable of recording and playing back a plurality of tracks simultaneously;

means for playing back selected tracks carrying audio narration and means for operation in response to the played back tracks for generating cue signals representative of still pictures to be displayed for said audio narration programs, said cue signals being decodable to identify the audio narration programs to which the cue signals relate; and means responsive to the cue signals for recording thereof on the audio tape during playback of the selected tracks to locate the cue signals on the audio tape in the order by which the still pictures of the respective audio narration programs are to be displayed.

28. The system for composing a plurality of audio narration programs as claimed in claim 27 wherein the multiple track audio tape is further selected to enable to accommodate a control track to store the cue signals, said cue signal recording means being operative to record the cue signals on the control track.

29. The system for composing a plurality of audio narration programs as claimed in claim 28 wherein the means for generating cue signals further includes means for operation in response to the playback of the audio narration for generating cue enabling signals; and means responsive to the cue enabling signals for producing said cue signals separated from each other by a minimum time.

30. The system for composing a plurality of audio narration programs as claimed in claim 29 and further including means for operation in response to a playback of the control track to identify the order of the still pictures of all of said audio narration programs during playback thereof.

31. The system for composing a plurality of audio narration programs as claimed in claim 30 wherein the cue signal recording means includes tone generators of different audio frequencies respectively related to the audio narration programs and selected to enable machine identification of the cue signals for corresponding display of still pictures.

32. A composer for recording a plurality of different video programs formed with still pictures on a common magnetic medium comprising a video camera for producing video frame signals of pictures;

a plurality of slide projectors which are selectively aligned to enable to project slides onto the video camera;

video signal recording means for recording video frames of still pictures projected onto the video camera by the slide projectors;

means for producing a cue signal to identify a slide projector;

means for selectively directing the projected slide of any one of the projectors onto the video camera; and means responsive to the cue signals for controlling said slide projection means to determine which slide is to be recorded as a video frame by the video signal recording means.

33. The composer for recording the plurality of different video programs as claimed in claim 32 wherein the cue signal producing means includes audio composing means for producing a magnetic audio recording of a plurality of audio programs of individually determined duration with identifiable cue signals located to indicate when still pictures related to the audio programs are to be displayed; and means for playing back the audio programs and cue signals from the audio recording with the audio programs being applied to the video signal recording means for recording with the video frames.

34. A method for combining a plurality of still picture programs formed of audio narration of individually determined durations and related to still pictures on a common video storage medium comprising the steps of recording audio narrations for a plurality of still picture programs on an audio magnetic medium;

recording cue signals which are individually representative of a still picture for the plurality of programs on the audio magnetic medium;

playing back the cue signals from the audio magnetic medium to obtain a determination of the order sequence of still pictures called for by the plurality of still picture program audio narrations as recorded on the audio magnetic medium;

arranging slides representative of the still pictures in a projector in the order sequence as determined by the playback of the cue signals;

playing back the audio magnetic medium to generate audio narration signals respectively representative of the still picture programs and said cue signals;

recording the audio narration signals on the common video storage medium;

recording, in response to played back cue signals, video frames of the projected slides on the common video storage medium and projecting successive slides for recording on the common storage medium.

35. The method for combining a plurality of still picture programs on a common video storage medium as claimed in claim 34 wherein the step of recording cue signals on the audio magnetic medium further includes the steps of generating the cue signals for the respective programs in the order in which the audio narrations require display of still pictures;

temporarily storing the cue signals; and recording the cue signals from their temporary storage on the audio magnetic medium with spaced relationship without overlap, with the spacing between successive cue signals being selected sufficiently long to enable slide changes in the projector in the time period occurring between successively played back cue signals during video frame recording.

36. The method for combining a plurality of still picture programs on a common video storage medium as claimed in claim 34 wherein the step of recording video frames on the common video storage medium further includes the steps of temporarily storing cue signals being played back from the audio magnetic medium; and extracting the cue signals from their temporary storage at intervals whose durations are selected sufficiently long to enable slide changes in the projector during video recording.

37. A system for playing back a video program formed of still pictures and motion sequence from a composite video storage medium on which is recorded a plurality of different audio programs with respectively associated video frames including at least one motion sequence and a plurality of still pictures for different programs, said video frames being identified on the video storage medium to relate to particular programs, the motion sequence video frames being alternately interlaced with still picture video frames to enable the playback of still pictures requiring display during the motion sequence and related to a different program comprising means for playing back and storing a video frame from the video storage medium to enable continuous display of a program recorded on the video storage medium;

means for playing back and selecting the audio for a program recorded on the video storage medium for projection with associated video frames;

means responsive to video frame identifying signals from the video storage medium for generating a playback control signal representative of the intervals when video frames related to a selected program are being played back from the composite video storage medium;

means actuated by the playback control signal for enabling display of video frames during playback of the video storage medium and enabling the recording of a video frame on the video frame storing means during said intervals; and means actuated by the playback control signal for enabling display of a video frame from the video frame storing means during time periods between said intervals to provide a smooth display of a motion sequence compatible with the display of still pictures relates to the selected programs.

38. The system for playing back a video program as claimed in claim 37 wherein the playback control signal generating means further includes means for playing back cue tone signals recorded on a track on the video storage medium, said detected cue tone signals having decodable characteristics for identification of video frames related to different programs recorded on the video storage medium;

means for decoding the played back cue tone signals to form said video frame identifying signals; and synchronizing means responsive to the video frame identifying signals for generating said playback control signal in synchronism with the video frames being played back from the common video storage medium.

39. A method for playing back a video program formed of still pictures and motion sequence from a composite video storage medium on which is recorded a plurality of different audio programs with respectively associated video frames including at least one motion sequence and a plurality of still pictures for different programs, said video frames being identified on the video storage medium to relate to particular programs, the motion sequence video frames being alternately interlaced with still picture video frames to enable the playback of still pictures requiring display during the motion sequence and related to a different program comprising the steps of storing and playing back a video frame from the video storage medium on a frame storage device to enable continuous display of a program recorded on the video storage medium;

playing back a selected audio program recorded on the video storage medium for projection with associated video frames;

playing back video frames from the composite video storage medium;

deriving video frame identifying signals from the video storage medium for generating a playback control signal representative of the intervals when video frames related to the selected program are being played back from the composite video storage medium;

recording in the sequence determined by the playback control signal each played back video frame related to the motion sequence on the frame storage device while simultaneously displaying the played back video frame; and playing back each motion sequence video frame recorded on the frame storage device for a single frame period occurring between the intervals determined by the playback control signal for a repeat display of the motion video frame, whereby a smooth display of a motion sequence is obtained compatible with the display of still picture programs recorded on the composite video storage medium.

* * * * *

UNITED STATES PATENT OFFICE
CERTIFICATE OF CORRECTION

Patent No. 4,009,331  Dated February 22, 1977

Inventor(s) Peter C. Goldmark, Donald T. Dolan, Arvind C. Desai, John M. Hollywood It is certified that error appears in the above-identified patent and that said Letters Patent are hereby corrected as shown below:

Column 2, line 45, "step" should be --steps--.
Column 6, line 23, "through" should be --though--.
Column 7, line 21, "52" should be --152--.
Column 8, line 3, "he" should be --the--.
Column 9, line 31, "o" should be --ō--.
Column 12, line 32, "drive" should be --divide--.
Column 16, line 45, "fop" should be --flop--.
Column 18, line 10, "o" should be --ō--.
Column 19, line 45, "62" should be --52--.
Column 20, line 18, "mechanical" should be --mechanism--;
        line 58, "this" should be --thus--.
Column 30, line 20, "relates" should be --related--.

Signed and Sealed this

Twenty-fourth Day of May 1977

[SEAL]

Attest:

RUTH C. MASON
Attesting Officer

C. MARSHALL DANN
Commissioner of Patents and Trademarks